US011159221B2

(12) United States Patent
Manolakos et al.

(10) Patent No.: US 11,159,221 B2
(45) Date of Patent: Oct. 26, 2021

(54) UE TRANSMISSION SCHEMES WITH SUBBAND PRECODING AND TPMI RE-INTERPRETATION

(71) Applicant: QUALCOMM Incorporated, San Diego, CA (US)

(72) Inventors: Alexandros Manolakos, San Diego, CA (US); Wei Yang, San Diego, CA (US); Gokul Sridharan, Sunnyvale, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/830,053

(22) Filed: Mar. 25, 2020

(65) Prior Publication Data

US 2020/0322026 A1 Oct. 8, 2020

Related U.S. Application Data

(60) Provisional application No. 62/829,479, filed on Apr. 4, 2019.

(51) Int. Cl.
*H04B 7/06* (2006.01)
*H04B 7/0456* (2017.01)
(Continued)

(52) U.S. Cl.
CPC .......... *H04B 7/0634* (2013.01); *H04B 1/713* (2013.01); *H04B 7/0456* (2013.01);
(Continued)

(58) Field of Classification Search
CPC .... H04B 7/0456; H04B 7/063; H04B 7/0634; H04W 52/08; H04W 72/042; H04W 72/1268; H04W 72/14; H04W 80/02
(Continued)

(56) References Cited

U.S. PATENT DOCUMENTS

2020/0162133 A1* 5/2020 Harrison .............. H04B 7/0456
2021/0135730 A1* 5/2021 Chai ...................... H04B 7/063

FOREIGN PATENT DOCUMENTS

CA          3052397 A1   10/2018

OTHER PUBLICATIONS

Discussion on codebook based transmission for UL, R1-1715794, 3GPP TSG RAN WG1 Meeting NR#3 (Year: 2017).*
(Continued)

*Primary Examiner* — Harun Chowdhury
(74) *Attorney, Agent, or Firm* — Arent Fox, LLP

(57) ABSTRACT

Aspects are provided allowing UEs with non-coherent or partially coherent antennas to re-interpret TPMI received in DCI into a set of TPMIs corresponding to different subbands. The UE receives a TPMI associated with at least one first antenna and at least one second antenna which are non-coherent with each other, and the UE determines a set of TPMIs including a first and second TPMI based on the received TPMI. The set of TPMIs include at least one TPMI different from the received TPMI. The UE transmits, based on the first TPMI, from the at least one first antenna within at least one first subband. The UE also transmits, based on the second TPMI, from the at least one second antenna within at least one second subband different from the at least one first subband. Thus, full power transmission based on re-interpreted TPMI with reduced DCI overhead may result.

30 Claims, 14 Drawing Sheets

(51) Int. Cl.
  *H04W 72/12* (2009.01)
  *H04W 72/14* (2009.01)
  *H04B 1/713* (2011.01)
  *H04W 80/02* (2009.01)
  *H04L 1/18* (2006.01)
  *H04W 8/24* (2009.01)
  *H04W 76/27* (2018.01)

(52) U.S. Cl.
  CPC ............ *H04L 1/1819* (2013.01); *H04W 8/24* (2013.01); *H04W 72/1268* (2013.01); *H04W 72/14* (2013.01); *H04W 76/27* (2018.02); *H04W 80/02* (2013.01)

(58) Field of Classification Search
  USPC ........................................ 370/252, 329, 336
  See application file for complete search history.

(56) References Cited

OTHER PUBLICATIONS

International Search Report and Written Opinion—PCT/US2020/025007—ISA/EPO—dated Jun. 4, 2020.
Qualcomm Incorporated: "Full Tx Power for UL Transmissions," 3GPP Draft, 3GPP TSG RAN WG1 #96bis, R1-1905028, Full Tx Power for UL Transmissions, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019 (Mar. 30, 2019), XP051691945, 21 pages, Retrieved from the Internet: URL: http://www.3gpp.org/ftp/tsg%5Fran/WG1%5FRL1/TSGR1%5F96b/Docs/R1%2D1905028%2Ezip [retrieved on Mar. 30, 2019] section 6-section 8 figures 7,8,10, 11, 12 tables 1, 2.
ZTE: "Full TX Power UL Transmission," 3GPP Draft, 3GPP TSG RAN WG1 Meeting #96bis, R1-1904015, Full TX Power UL Transmission, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019 (Mar. 30, 2019), XP051691229, 8 pages, Retrieved from the Internet: URL: http://www.3gpp.org/ftp/tsg%5Fran/WG1%5FRL1/TSGR1%5F96b/Docs/R1%2D1904015%2Ezip [retrieved on Mar. 30, 2019] the whole document.

\* cited by examiner

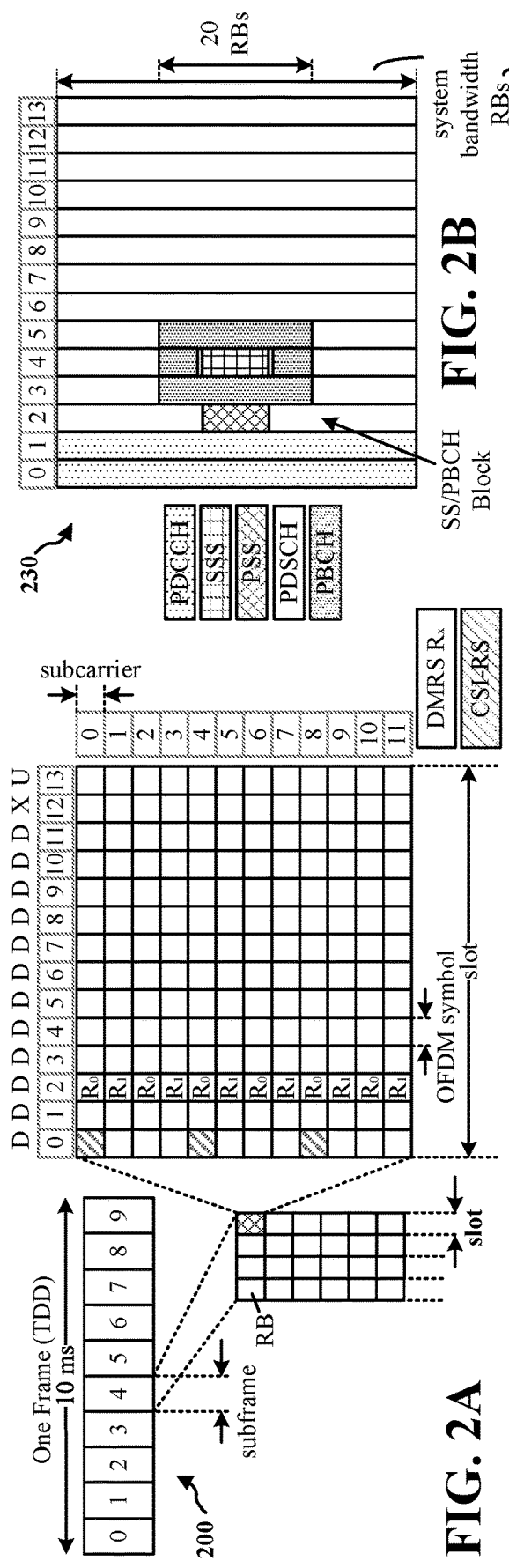
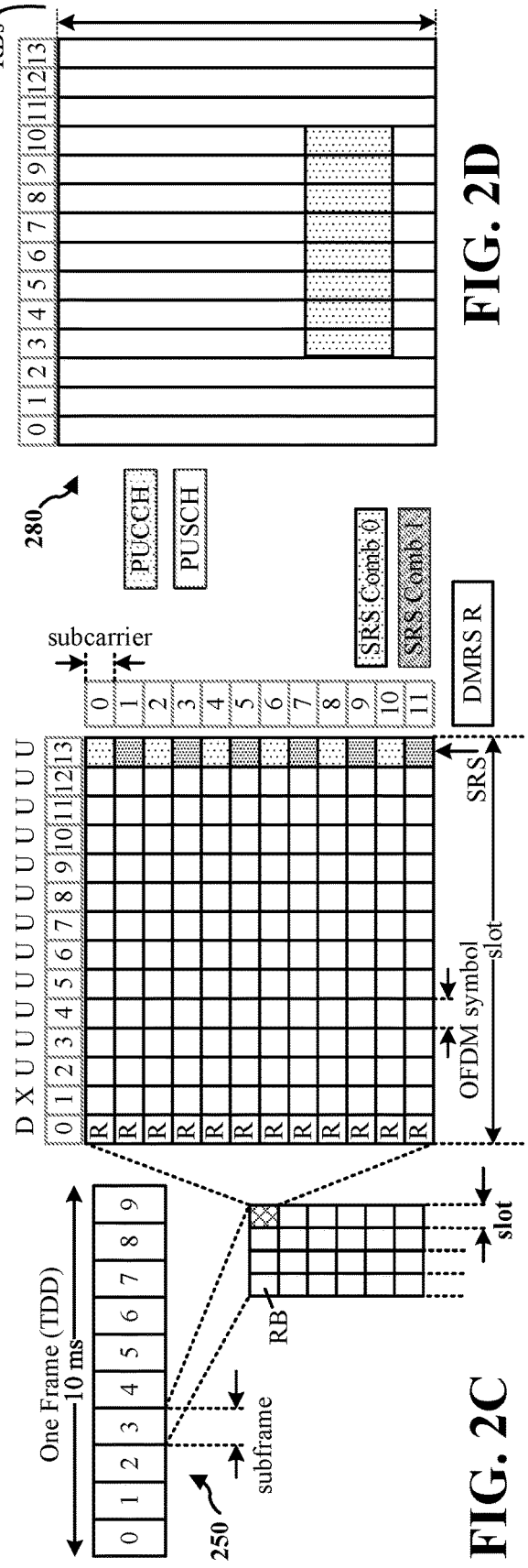
FIG. 2A
FIG. 2B
FIG. 2C
FIG. 2D

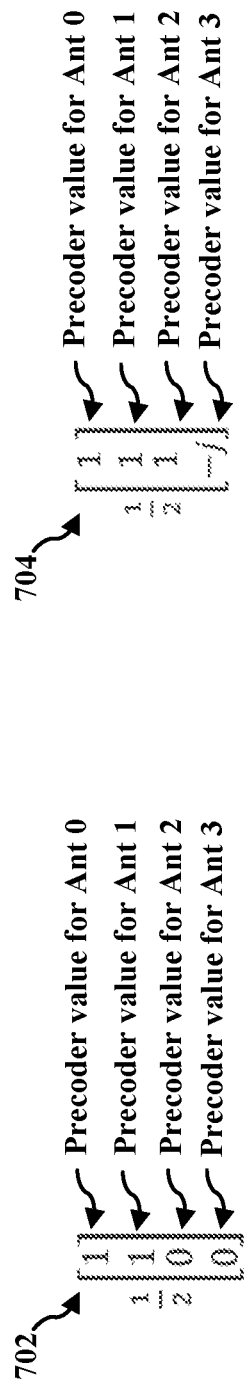
FIG. 7A
FIG. 7B
FIG. 7C
FIG. 7D

UE TRANSMISSION SCHEMES WITH SUBBAND PRECODING AND TPMI RE-INTERPRETATION

CROSS REFERENCE TO RELATED APPLICATION(S)

This application claims the benefit of U.S. Provisional Application Ser. No. 62/829,479, entitled "SUBBAND PRECODING AND PRECODING BUNDLING ON UPLINK TO ACHIEVE FULL TRANSMIT POWER" and filed on Apr. 4, 2019, which is expressly incorporated by reference herein in its entirety.

BACKGROUND

Technical Field

The present disclosure relates generally to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE may be configured with multiple antennas that are non-coherent, or partially coherent, with respect to each other. Such antennas may lead to challenges for transmissions from the UE since a UE with non-coherent or partially coherent antennas may not transmit using a full transmission power of that UE. Generally, in power control, the UE may scale its transmission power (as determined by power control) by the ratio of the number of antenna ports with a non-zero physical uplink shared channel (PUSCH) transmission to the number of configured antenna ports for the transmission scheme. The resulting scaled power may then be split equally across the antenna ports on which the non-zero PUSCH is transmitted. Moreover, in MIMO codebooks, generally one of the non-coherent antennas (or a set of partially coherent antennas) may include a non-zero precoder while the other antennas (or sets of antennas) include zero precoders such that non-coherent antennas may not transmit data simultaneously on the same layer. The precoders may be based on a transmitted precoding matrix indicator (TPMI) received in downlink control information (DCI). As a result, scaled power may be split equally with non-transmitting antennas (i.e. with zero precoders as configured by TPMI), resulting in less transmission power overall for the UE. For example, a UE with two non-coherent antennas that receives a TPMI of [0, 1] may have power split equally among the antennas (½ power), but since one of the two antennas has a zero precoder and is thus not transmitting, half the power is effectively lost.

To address this problem, the present disclosure allows for the UE to reinterpret the TPMI. When the UE receives a TPMI in DCI, the UE may determine a set of TPMIs based on the received TPMI. The set of TPMIs may then be used to transmit across multiple subbands. Together, the subbands may add to a full power transmission. For example, if a UE with two non-coherent antennas with equally split power (½ power) receives a TPMI of [0, 1], the UE may reinterpret the TPMI to determine a set of TPMIs: [1, 0] for a first subband and [0, 1] for a second subband. The UE may then transmit using the first antenna with non-zero precoder on the first subband based on the first reinterpreted TPMI ([1, 0]), and using the second antenna with non-zero precoder on the second subband based on the second reinterpreted TPMI ([0, 1]). Similar TPMI reinterpretation may be applied for partially coherent antennas. Thus, the UE may achieve full transmission power in such circumstances. Moreover, the present disclosure allows for reduced overhead in DCI, since the UE may interpret multiple TPMIs from a single TPMI in DCI (e.g. without additional bits).

In an aspect of the disclosure, a method, a computer-readable medium, and an apparatus are provided. The apparatus may be a UE. The apparatus receives a TPMI associated with at least one first antenna and at least one second antenna, where the at least one first antenna and the at least one second antenna are non-coherent with each other. The apparatus determines a set of TPMIs based on the received TPMI, where the set of TPMIs includes at least one TPMI different from the received TPMI. The apparatus transmits, based on a first TPMI of the set of TPMIs, from the at least one first antenna within at least one first subband. The apparatus also transmits, based on a second TPMI of the set of TPMIs, from the at least one second antenna within at least one second subband different from the at least one first subband.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 7A, 7B, 7C, and 7D illustrate example precoder matrices.

DETAILED DESCRIPTION

Figure 1:
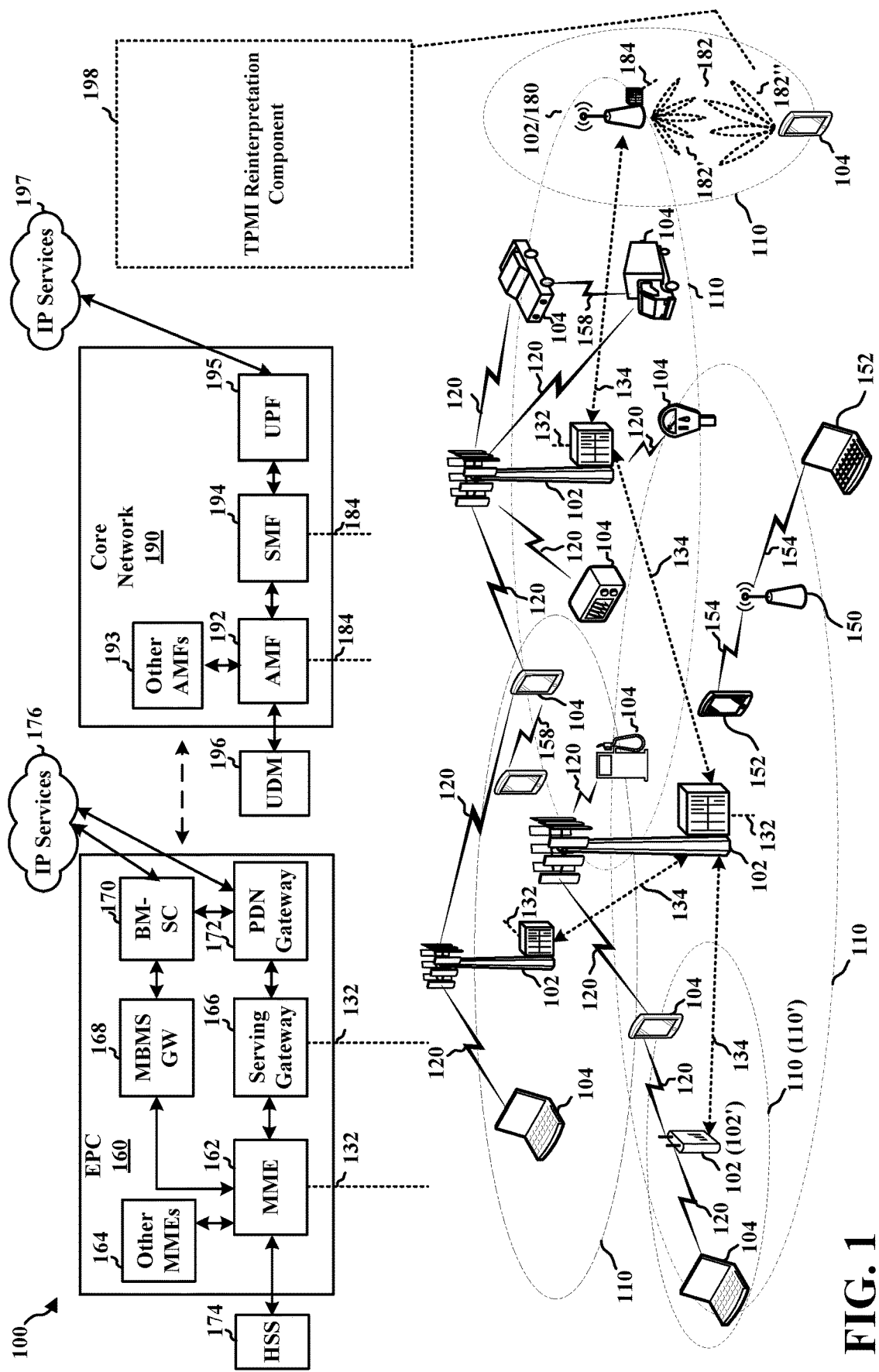
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a TPMI reinterpretation component 198. The TPMI reinterpretation component 198 may receive a TPMI associated with at least one first antenna and at least one second antenna, where the at least one first antenna and the at least one second antenna are non-coherent with each other. The TPMI reinterpretation component 198 may determine a set of TPMIs based on the received TPMI, where the set of TPMIs includes at least one TPMI different from the received TPMI. The TPMI reinterpretation component 198 may transmit, based on a first TPMI of the set of TPMIs, from the at least one first antenna within at least one first subband, and may transmit, based on a second TPMI of the set of TPMIs, from the at least one second antenna within at least one second subband different from the at least one first subband. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
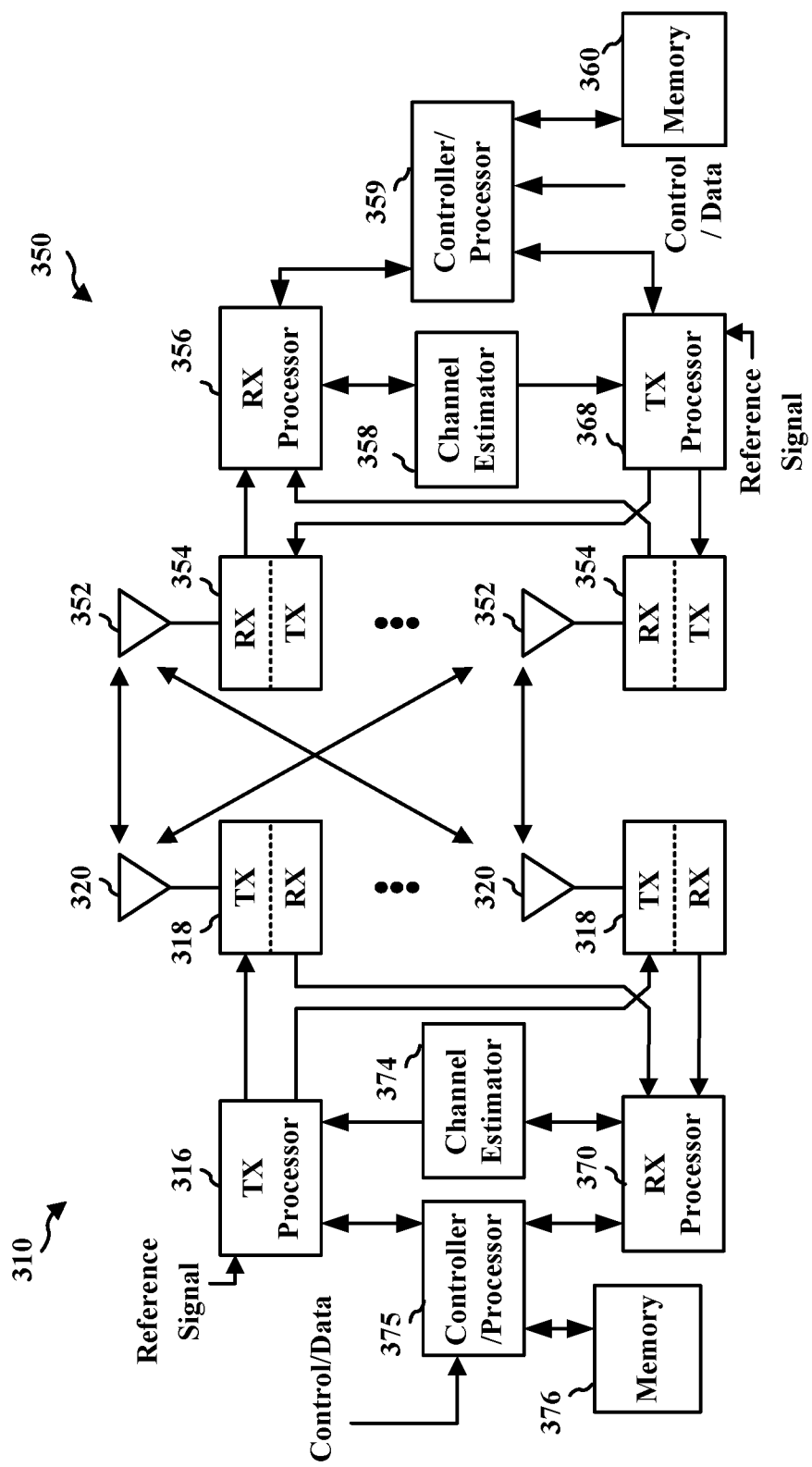
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with TPMI reinterpretation component 198 of FIG. 1.

In certain cases, a UE with partially coherent or non-coherent antennas may not transmit with full power based on power control. Generally, the UE may scale the transmission power, as determined by power control, by the ratio of the number of antenna ports with a non-zero PUSCH transmission to the number of configured antenna ports for the transmission scheme. The resulting scaled power is then split equally across the antenna ports on which the non-zero PUSCH is transmitted. Moreover, in a MIMO codebook with two or more non-coherent antennas or sets of non-coherent antennas (e.g. partially coherent antennas), only one antenna or set may have a non-zero precoder, while any other antenna or set may have zero precoders. For example, non-coherent antennas may not generally transmit data simultaneously on the same layer.

As a result, a MIMO codebook with two non-coherent antennas or sets of non-coherent antennas may result in a ½ power transmission. For example, for a pair of non-coherent antennas, only one antenna may transmit in cases where the configured antenna ports for the transmission scheme is 2 and the number of antenna ports with a non-zero PUSCH transmission is 1. In such cases, a transmission of ½ power (1 non-zero PUSCH transmission divided by 2 antenna ports for the transmission scheme) will result. For example, a first antenna may have a precoder value of $1/\sqrt{2}$, while a second antenna may have a precoder value of 0. Accordingly, the power transmitted will be $(0)^2+(1/\sqrt{2})^2$ or ½ power. Similarly, a MMO codebook with three non-coherent antennas or sets of non-coherent antennas may result in a ⅓ power transmission, and so forth for greater numbers of non-coherent antennas or sets.

To compensate for this power reduction, the wireless communication device or UE may re-interpret a TPMI as a set of TPMIs. In other words, when a TPMI is received, the UE may generate a set of TPMIs from the TPMI. For example, the set of TPMIs may include the received TPMI and a second TPMI. The set of TPMIs may be used to transmit, for example 1/X power across X subbands and thus resulting in full power. For example, a set of two TPMIs may be used to transmit on two physical antennas, with each antenna transmitting on a separate subband. The UE will, then transmit full power, for example, (½ power)+(½ power)=Full Power.

Figure 4:
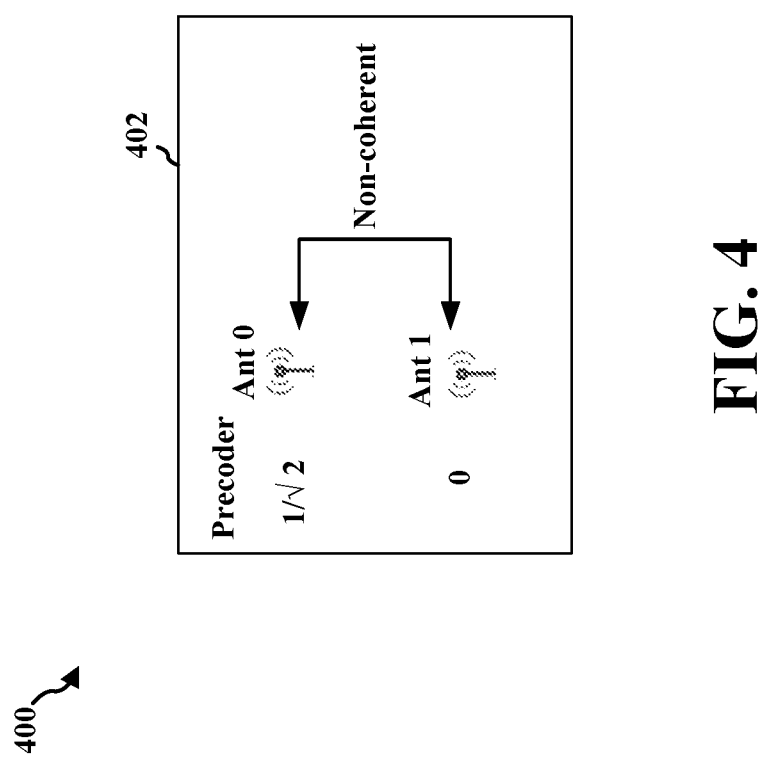
FIG. 4 illustrates an example of a wireless communication device having non-coherent antenna ports.

FIG. 4 illustrates an example 400 of a wireless communication device 402 or UE having two non-coherent antennas that may experience power reduction. In this example, the wireless communication device 402 may not maintain phase coherence between a first antenna (Ant 0) and a second antenna (Ant 1). The antennas may have different precoder values, as shown. For example, Ant 0 may be associated with a precoder value of $1/\sqrt{2}$ while Ant 1 may be associated with a precoder value of 0 based on a received TPMI (e.g. [1, 0]). Accordingly, in FIG. 4, ½ power may be transmitted because Ant 0 transmits and antenna 1 does not transmit, e.g., $(0)^2+(½)^2$ or ½ power.

Figure 5:
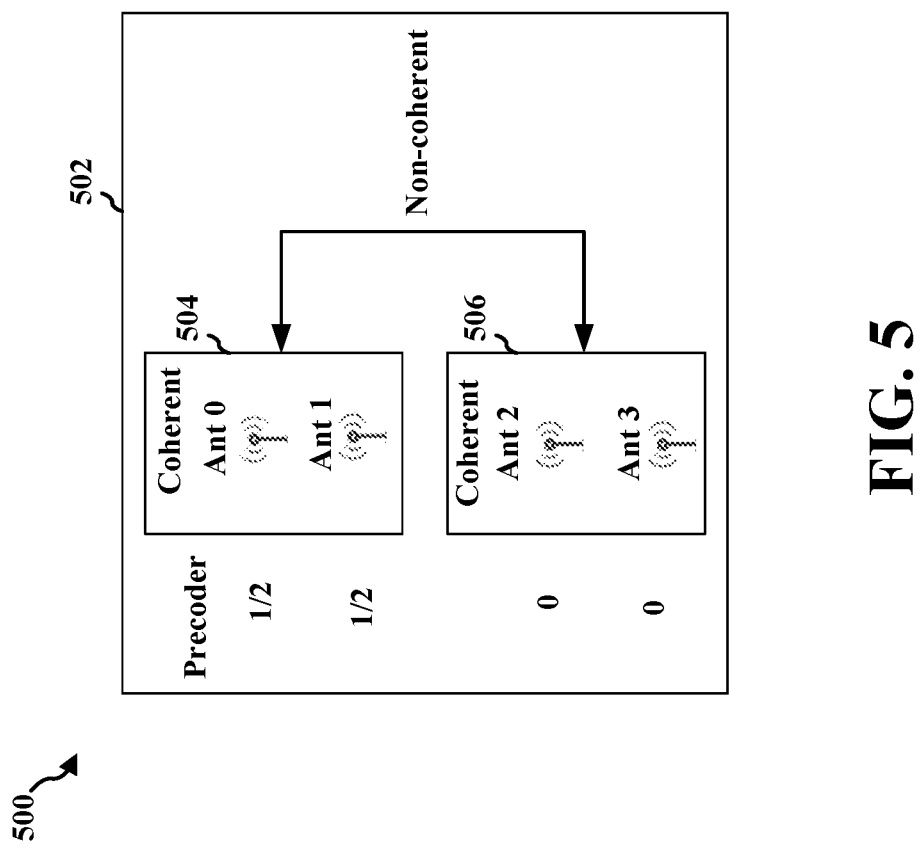
FIG. 5 illustrates an example of a wireless communication device having partially coherent antenna ports.

FIG. 5 illustrates another example 500 of a wireless communication device 502 or UE having partially coherent antennas that may also experience power reduction. For example, a first set of antennas 504 may be coherent with respect to each other. Thus, Ant 0 and Ant 1 in set 504 are capable of maintaining a relative phase difference between each other over time. Similarly, a second set of antennas 506 may be coherent with respect to each other, with Ant 2 and Ant 3 being capable of maintaining a relative phase difference between each other over time. However, the first set of coherent antennas 504 may be non-coherent with the second set of coherent antennas 506. For example, the wireless communication device 502 may not maintain phase coherence between Ant 0 in set 504 and Ant 2 in set 506, and similarly may not maintain phase coherence between Ant 1 in set 504 and Ant 3 in set 506. In other words, the wireless communication device can maintain phase coherence between antennas included in each of two antenna groups (e.g., first antenna set 504 and second antenna set 506), but may not maintain phase coherence between the two antenna groups. Therefore, the wireless communication device 502 may be described as being capable of achieving partial coherence among antenna ports of the wireless communication device or as having partially coherent antennas. The non-coherent antenna sets may be associated with different precoder values, as shown in FIG. 5. For example, Ant 0 and Ant 1 in the first coherent set 504 may be associated with a precoder value of ½ while Ant 2 and Ant 3 in the second coherent set 506 may be associated with a precoder value of 0 based on a received TPMI (e.g. [1, 1, 0, 0]). Accordingly, as discussed in greater detail below, the wireless communication device 502 may transmit at ½ power, e.g., $(½)^2+(½)^2+(0)^2+(0)^2$.

Thus, FIGS. 4 and 5 illustrate examples 400, 500 of wireless communication devices 402, 502 (e.g. UEs) that may experience power reduction. In each example, the wireless communication device may transmit at half power, e.g., $(0)^2+(1/\sqrt{2})^2$ (for FIG. 4) or $(½)^2+(½)^2+(0)^2+(0)^2$ (for FIG. 5). However, the number of antennas shown in FIGS. 4 and 5 are merely examples. For example, while FIG. 5 only illustrates two sets of partially coherent antennas, a wireless communication device may include any number of sets of partially coherent antennas. Further, each partially coherent set may include any number of coherent antennas.

In some wireless networks, a wireless communication device may be assumed to be capable of achieving full coherence. In such cases, a MIMO scheme associated with transmitting a signal using the multiple antennas of the wireless communication device, may be designed under the assumption of full coherence. In other cases, wireless communication involving only partial coherence may have unique challenges for MIMO communication. For example, limitations may be placed on transmission power for a UE with partially coherent antennas that restrict the UE from transmitting with full transmit power. A UE may determine a transmit power for data transmission, e.g., for transmitting PUSCH, based on uplink power control signaling received from the base station. The transmit power is a power level without power scaling by the UE to reduce the transmit power. For example, uplink power control may determine the average power over an OFDM symbol in which the physical channel is transmitted by the UE.

Generally, as part of power control at the UE, the UE may further scale the transmit power that it determined based on the power control signaling from the base station. The UE may first scale the determined transmit power by the ratio of the number of antenna ports with a non-zero PUSCH transmission to the number of configured antenna ports for the transmission scheme. The resulting scaled power may then be split equally across the antenna ports on which the non-zero PUSCH is transmitted. For example, as illustrated in FIG. 5, the wireless communication device 502 may have four configured antenna ports (Ant 0, Ant 1, Ant 2, Ant 3), with two of the four antenna ports having non-zero PUSCH (Ant 0, Ant 1). When the wireless communication device determines a transmit power of P based on power control signaling from a base station, the transmit power P would be scaled by the ratio of 2 to 4, e.g., 2. Then, the scaled transmit power, P/2, would be split evenly between Ant 0 and Ant 1. Therefore, the two antenna ports, Ant 0 and Ant 1, would each transmit the PUSCH with a transmit power of P/4. The actual transmit power used by the UE would total (P/4+P/4=P/2).

Figure 6A:
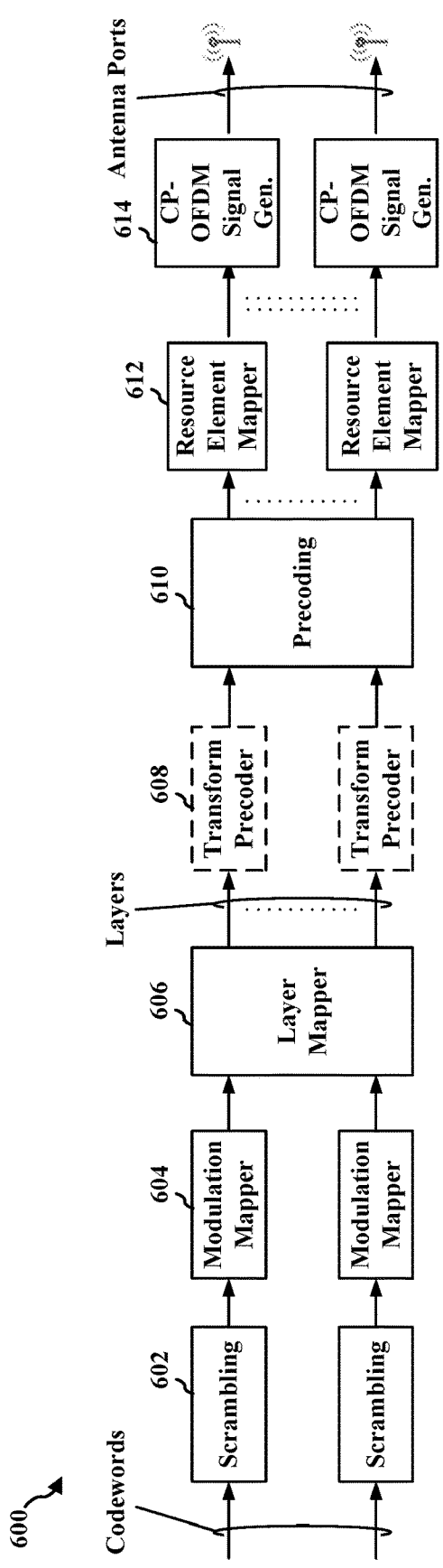
FIGS. 6A and 6B illustrate example aspects of generating a data transmission.

FIG. 6A illustrates an example 600 of aspects that may be employed in uplink physical channel processing at a UE. A baseband signal representing the PUSCH may be generated by scrambling 602, modulation 604 of scrambled bits to generate complex-valued symbols, mapping 606 of the complex-valued modulation symbols onto one or more transmission layers, precoding 610 of the one or more layers of the complex-valued symbols, mapping 612 of precoded complex-valued symbols to resource elements, and generation 614 of complex-valued time-domain Cyclic Prefix Orthogonal Frequency Division Multiplexing (CP-OFDM) signals for each antenna port. In another example, the uplink transmission may be based on Discrete Fourier Transform-spread-OFDM (DFT-s-OFDM), in which a transform precoder 608 may be applied after the layer mapper 606 and prior to the precoding 610 on each layer. Thus, the transform precoder 608 may be enabled or disabled based on the signal being generated. For precoding 610, a precoder may receive input from a layer mapper 606 and generate a block of vectors to be mapped onto resource elements. Precoding 610 may be performed for spatial multiplexing, e.g., based on the layers onto which the codewords are mapped as part of layer mapping. Precoding 610 for spatial multiplexing may be based on a precoding matrix. The precoding matrix may be given by a table entry or a codebook. A matrix may be selected by the UE based on a number of antenna ports, a codebook index, a number of mapped layers, etc. A MIMO codebook may take into account sets of non-coherent antenna ports and may provide only one set of antenna ports with a non-zero precoder value. The other antenna port set(s) may have a zero precoder value. Thus, the codebook prevents simultaneous transmission of the PUSCH from non-coherent antennas.

FIG. 7A illustrates an example codebook matrix 702 that prevents such simultaneous transmission between the non-coherent antenna ports in the example of FIG. 5. In FIG. 7A, Ant 2 and Ant 3 will have a precoder value of 0 and will not transmit PUSCH, while Ant 0 and Ant 1 will have a non-zero precoder value of 2 for the PUSCH transmission. Similarly, the matrix 706 in FIG. 7C gives Ant 2 and Ant 3 a precoder value of 0, while Ant 0 and Ant 1 have a non-zero precoder value for the PUSCH transmission. Thus, the matrices in FIGS. 7A and 7C avoid simultaneous transmission from the non-coherent antenna sets. A UE may comprise partial coherent antenna ports, e.g., as described in connection with FIG. 5. In the example illustrated in FIG. 5, the UE may use a codebook that limits non-zero PUSCH transmission to either the first coherent antenna set 504 or the second coherent antenna set 506, but that does not provide for simultaneous, non-zero PUSCH transmission from both sets of antennas that are non-coherent with each other. Thus, the UE may apply a codebook with matrix values similar to the example matrices 702, 706 in FIGS. 7A and 7C.

In one example approach to increase power transmission, the UE may split a non-scaled transmit power, e.g., P, across the antenna ports on which the non-zero PUSCH is transmitted. In the example of FIG. 5, the transmit power per antenna port would be P/2 for Ant 0 and P/2 for Ant 1. Thus, the total transmit power (P/2+P/2) for the antenna ports having a non-zero PUSCH transmission would be equal to the full transmit power P, e.g., the full transmit power determined by the UE based on the power control signaling from the base station. Thus, the total actual transmit power by the UE is P, the full, determined transmit power, e.g., without scaling by the ratio of the number of antenna ports with a non-zero PUSCH transmission to the number of configured antenna ports for the transmission scheme.

In another example approach, the UE may improve the use of its transmission power through simultaneous transmission of data using non-coherent antennas. The UE may use a different transmit scheme that enables non-coherent antenna sets to transmit PUSCH simultaneously. For example, the UE may use a MIMO codebook that provides non-zero values for antennas that are non-coherent with each other, e.g., antenna(s) in a first set that are non-coherent with antenna(s) in a second set. FIGS. 7B and 7D illustrate example matrices 704, 708 that provide non-zero values for simultaneous transmission between the non-coherent antennas in the example of FIG. 5. The four antennas of FIG. 5 may simultaneously transmit PUSCH using the matrices in either FIG. 7B or 7D. The UE may split the transmission power among the antenna ports. By using all four antennas to transmit the PUSCH, the transmit power may be split evenly among the 4 antennas, with each antenna port transmitting the PUSCH using a power P/4. Therefore, the total transmit power actually used for the transmission at the four antenna ports (e.g., P/4+P/4+P/4+P/4) will be equal to the full transmit power, P, determined by the UE based on the power control signaling from the base station.

Figure 6B:
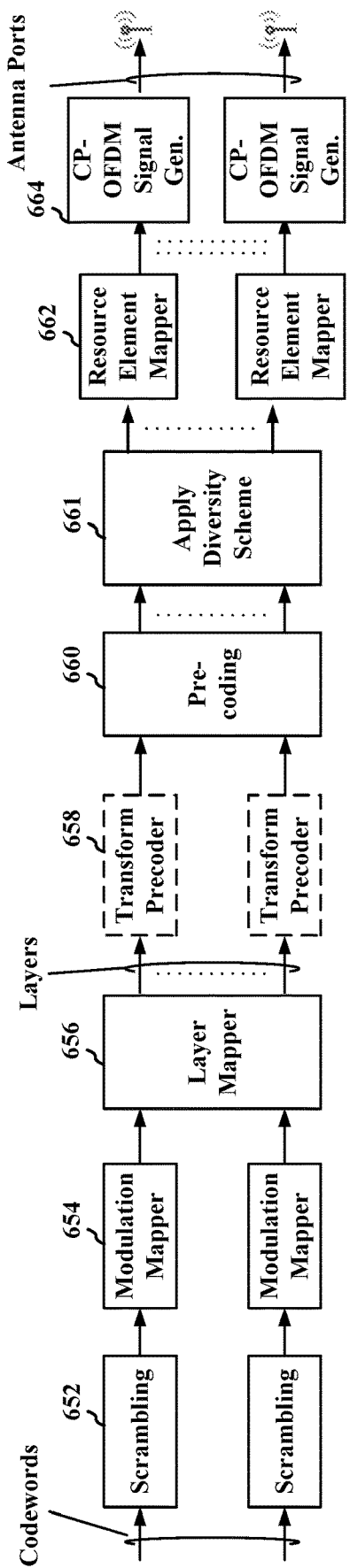

In a further example approach, as the relative phase difference between the non-coherent antenna sets may vary, the UE may apply a diversity scheme among the non-coherent sets of antennas. FIG. 6B illustrates an example 650 that may be employed at a UE to generate a baseband signal representing PUSCH. Similar to the example in FIG. 6A, a baseband signal representing the PUSCH may be generated by scrambling 652, modulation 654 of scrambled bits to generate complex-valued symbols, mapping 656 of the complex-valued modulation symbols onto one or more transmission layers, precoding 658, 660 of the one or more layers of the complex-valued symbols, mapping 662 of precoded complex-valued symbols to resource elements, and generation 664 of complex-valued time-domain Cyclic Prefix Orthogonal Frequency Division Multiplexing (CP-OFDM) signals for each antenna port. However, in FIG. 6B, the UE may also apply a diversity scheme at 661. While the diversity scheme is illustrated after precoding 660, the diversity scheme may also be applied prior to precoding, in other examples. In the example in FIG. 5, the diversity scheme would be applied among the first antenna set 504 and the second antenna set 506. In another example, the UE may apply an open-loop, non-transparent diversity scheme among the first antenna set 504 and the second antenna set 506.

When the UE (e.g. wireless device 402, 502 of FIGS. 4 and 5) receives a TPMI from a base station indicating a zero precoder, such as the matrices 702, 706 illustrated in FIGS. 7A and 7B and described above (e.g. [0, 1], [1, 1, 0, 0], etc.), the UE's overall uplink (UL) transmission power may be reduced since the TPMI is typically applied to an entire bandwidth of the UE. To resolve this issue, when the UE receives a TPMI with a zero precoder, the UE may re-interpret the TPMI to apply it differently for different subbands. For example, if the UE receives a TPMI of [0, 1], then rather than applying the received TPMI of [0, 1] across the entire bandwidth, the UE may re-interpret the TPMI such that it applies [1, 0] for one subband of a PUSCH allocation (e.g. one half of the total bandwidth) and [0, 1] for the other subband of the PUSCH allocation (e.g. the other half of the total bandwidth). In this way, rather than having one antenna or set of antennas transmit at reduced power across the entire bandwidth as described above, the UE may have different antennas or set of antennas transmit at reduced power in different subbands such that the combined transmission power across the different subbands totals the UE's full UL transmission power. For instance, referring to FIG. 4, if the UE receives a TPMI of [0, 1], then rather than having Ant 1 transmit at half power across the entire PUSCH allocation, the UE may have Ant 1 transmit at half power across a first subband of the PUSCH allocation, and Ant 0 transmit at half power across a second subband of the PUSCH allocation, such that full power is transmitted in combination across both subbands. In this way, non-coherent antennas may be simultaneously used in different subbands with full transmission power.

The UE may autonomously determine whether to re-interpret the TPMI as described above, or to simply use the received TPMI without re-interpretation, based on whether the UE has reached a power amplifier (PA) power limit. If the UE has not reached the PA power limit, the UE may interpret the TPMI as originally indicated (e.g. [0, 1]) since the UE may still increase its transmission power up to the PA limit to compensate for any reduced transmission power due to precoding. However, if the UE has reached the PA power limit, the UE may not be able to increase its transmission power further, and so the UE may determine to re-interpret the TPMI (e.g. re-interpret [0, 1] as: [1, 0] for one subband and [0, 1] for another subband) to compensate for the reduced transmission power. For example, if the UE has non-coherent antennas or partially coherent antennas such as illustrated in the examples of FIGS. 4 and 5 (e.g. the UE has "capability 2"), the UE may determine whether to re-interpret a received TPMI or not based on a location of the UE. For instance, if the UE is located near a base station at the center of the cell, the UE may be below the PA limit and determine not to re-interpret TPMI, while if the UE is at a cell edge, the UE may have reached the PA limit and may determine to re-interpret TPMI.

The base station may configure the UE with respect to how each TPMI indication (received TPMI) is mapped into TPMI bundles for re-interpretation, e.g., in a RRC message or a Medium Access Control (MAC) Control Element (MAC-CE). For example, if the UE has two non-coherent antennas such as illustrated in FIG. 4, the UE may be configured via RRC or MAC-CE with a mapping that a received TPMI of [0, 1] may correspond to the following example TPMI bundle: [1, 0] for the first subband and [0, 1] for the second subband. The UE may similarly be configured with different mappings or TPMI bundles for different received TPMIs and numbers of antennas. For example, if the UE has two partially coherent sets of non-coherent antennas such as illustrated in FIG. 5 (four antennas total), the UE may be configured by the base station with a mapping that a received TPMI of [1, 1, 0, 0] may correspond to the following example TPMI bundle: [1, 0, 1, 0] for a first subband, [0, 1, 0, 1] for a second subband, [0, 1, 1, 0] for a third subband, and [1, 0, 0, 1] for a fourth subband. The number of subbands may be equal to the number of antennas.

The base station may also configure the UE with respect to how the PUSCH allocation is to be split in different subbands. For instance, if the base station schedules an allocation of PUSCH resources (e.g. in DCI) to the UE of 20 PRBs, the base station may configure the UE to split the PUSCH allocation equally (e.g. 10 PRBs in one subband and 10 PRBs in another subband) or unequally (e.g. 5 PRBs in one subband and 15 PRBs in another subband).

When the PUSCH allocation is split into a given number of subbands, the UE may apply a different TPMI from the TPMI bundle to each subband. The number of subbands may correspond to a number of TPMIs in a TPMI bundle or a number of antennas of the UE (e.g. two subbands for two antennas as illustrated in FIG. 4, four subbands for four antennas as illustrated in FIG. 5, etc.). The subbands may also be split among RBs with an equal or near equal distribution. For example, assuming a PUSCH allocation of B RBs over X subbands, the number of RBs for each subband may be floor(B/X), with any remainder of RBs being in the last subband. Thus, a PUSCH allocation of 20 RBs for a TPMI bundle of 4 TPMIs may be split equally into four subbands of 5 RBs each, while a PUSCH allocation of 22 RBs for the same TPMI bundle may be split into three subbands of 5 RB and one subband of 7 RB.

When the total PUSCH allocation of all subbands is smaller than a threshold (e.g. 3 RBs), or when the difference in PUSCH allocation between two subbands is greater than the threshold, the UE may refrain from re-interpreting TPMI and instead use the received TPMI for all subbands in order to prevent a high imbalance across the antennas. For example, assuming a PUSCH allocation of B RBs and given X subbands, the subbands may be divided into floor(B/X) RBs for all subbands except the last subband, which includes B−(X−1)*floor(B/X) RBs. If the difference between floor (B/X) and B−(X−1)*floor(B/X) is greater than a threshold, the UE may apply wideband TPMI and refrain from applying subband TPMI (i.e. re-interpreted TPMI). Otherwise, the UE may apply re-interpreted TPMI. As an example, if the PUSCH allocation is 22 RBs and there are 4 subbands, three subbands may be allocated 5 RBs and the fourth subband would be allocated 7 RB. In such case, if the configured threshold is 3 RBs, the UE may apply re-interpreted TPMI since the difference (e.g. 7 RBs−5 RBs) is less than the threshold (e.g. 3 RBs). Alternatively, if the configured threshold is 1 RB, the UE may apply wideband TPMI and refrain from re-interpreting TPMI since the difference (7 RBs−5 RBs) is greater than the configured threshold (e.g. 1 RB). As a result, an imbalance of power that may result from applying the same split power to different RB allocations in subbands may be prevented.

The number of subbands X may also be configured based on a UE capability message of the UE. The UE capability message may indicate, for example, how many subbands may exist (e.g. based on the number of antennas of the UE), the minimum size of each subband, and the maximum difference in size between any two subbands. For instance, the UE may report a UE capability message indicating the aforementioned subband information to the base station, and the base station may send an RRC message to the UE configuring a number of subbands and/or size of each subband based on the subband information. The UE may then apply re-interpreted TPMI to each subband. Alternatively, the UE may determine a number of subbands and sizes of each subband autonomously, and the UE may report the number of subbands and the sizes of each subband for the base station to reference (e.g. in the UE capability message).

The UE may also apply re-interpreted TPMI when performing inter-slot or intra-slot frequency hopping. In frequency hopping, the bandwidth may generally be split based on a number of hops (e.g. 20 MHz may be split into two bands of 10 MHz each corresponding to one hop). In intra-slot frequency hopping, the bandwidth may also be split based on a number of symbols (e.g. the first hop in the first 10 MHz band may span the first 7 symbols of a single slot, and the second hop in the second 10 MHz band may span the last 7 symbols of the single slot). However, when the ULE receives a TPMI for a frequency range corresponding to one hop (e.g. 10 MHz in the above example), the ULE may re-interpret the TPMI as corresponding to different subbands within the hop. For instance, if the UE receives a TPMI of [0, 1], the UE may split the 10 MHz into different subbands of 5 MHz in which the UE may apply different re-interpreted TPMI (e.g. [1,0] in the first 5 MHz and [0, 1] in the second 5 MHz). Moreover, whenever the UE hops to a next frequency (whether inter-slot or intra-slot), the UE may switch or cycle the antennas transmitting in the different subbands. For example, referring to FIG. 4, if the wireless communication device 402 is performing frequency hopping and receives a TPMI of [0, 1] (which corresponds to the TPMI bundle: [1, 0] and [0, 1]), Ant 0 may transmit in the first sub-band of the first hop and Ant 1 may transmit in the second sub-band of the first hop, while Ant 1 may transmit in the first sub-band of the second hop and Ant 0 may transmit in the second sub-band of the second hop. Thus, Antennas 0 and 1 may cycle or switch between subbands.

As a result, the UE may apply TPMI re-interpretation and bundling not only for achieving full transmission power for non-coherent antennas with zero precoders as described above, but also for reducing DCI overhead. When the UE receives DCI from the base station scheduling a PUSCH transmission, a certain number of bits may be used for wideband TPMI. For instance, when the UE has two non-coherent antennas as illustrated in FIG. 4, one bit in DCI may indicate to the UE whether to apply TPMI [0, 1] or TPMI [1, 0] when transmitting from its two antennas. The UE may also receive an RRC or MAC-CE configuring different mappings of wideband TPMIs to subband TPMIs. Thus, one bit in DCI may effectively indicate several TPMI for two antennas based on the RRC or MAC-CE mapping configuration. In this way, DCI overhead may be reduced. Therefore, TPMI reinterpretation for different subbands may be used to improve wireless communication in multiple ways (e.g. allowing for full transmission power, reducing DCI overhead, etc.).

Figure 8:
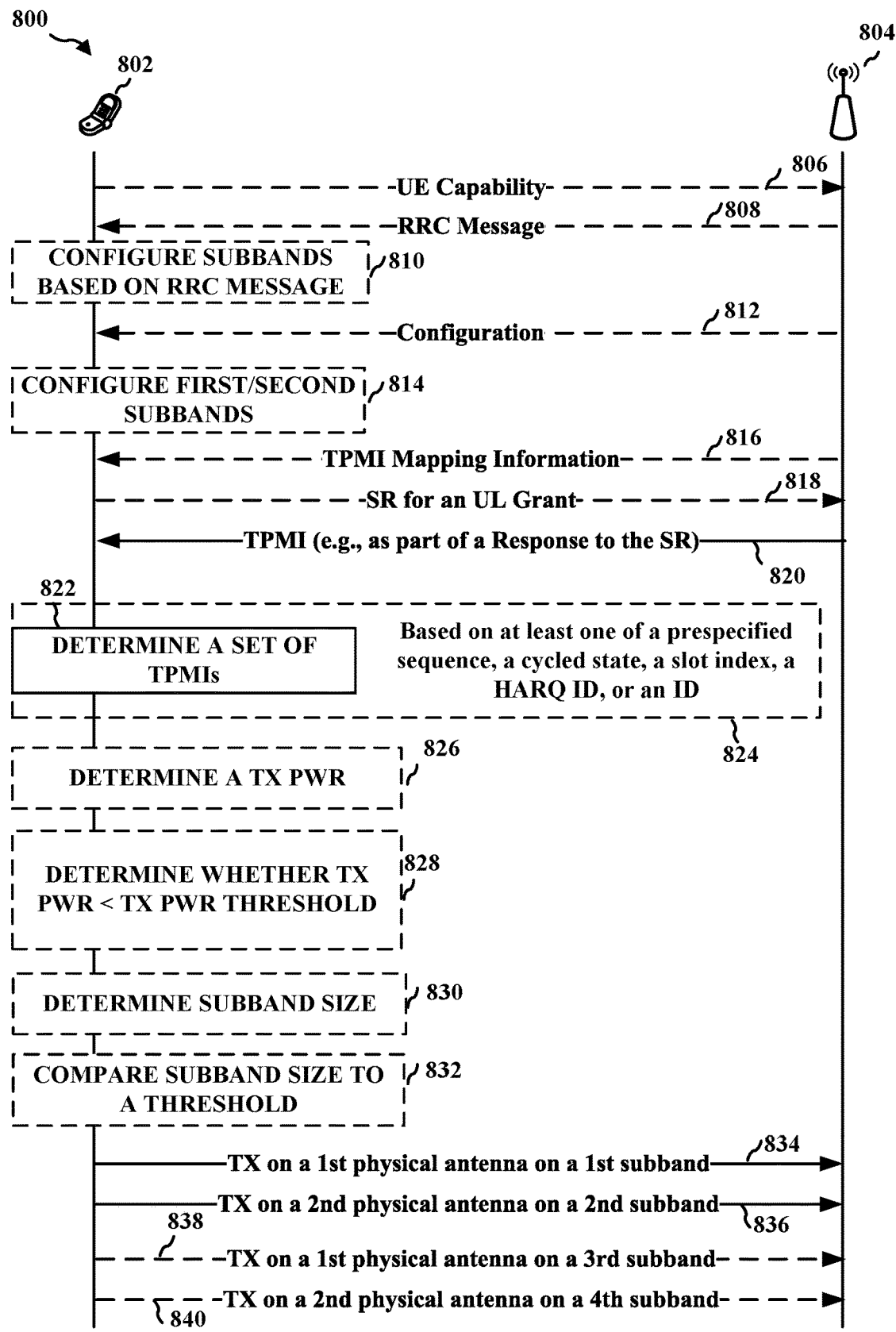
FIG. 8 illustrates an example communication flow between a UE and a base station.

FIG. 8 illustrates an example communication flow 800 between a UE 802 and a base station 804 that may involve aspects for reinterpreting TPMI for various subbands (thus improving transmission power at the UE, reducing DCI overhead, etc.). The UE 802 may comprise non-coherent antenna ports, e.g., as described with respect to FIG. 4 or partially coherent antenna ports, e.g., as described in connection with FIG. 5.

The UE 802 may report the UE's capability 806 to a base station 804. That is, the UE 802 may transmit a report to the base station 804 that provides UE capability information. The UE capability may provide information on one or more of (1) how many subbands exist, (2) a minimum size of each subband, or (3) a maximum difference in size between any two subbands. Each of these one or more subbands may include a first subband and a second subband.

The base station 804 may transmit an RRC message 808. Accordingly, the UE 802 may receive the RRC message 808. The RRC message may include information for configuring the subbands. Thus, at block 810, the UE 802 may configure at least one of the first subband or the second subband based on the RRC message.

The base station 804 may transmit a configuration 812. Accordingly, the UE 802 may receive the configuration. The configuration may indicate time-frequency resources associated with the first subband and the second subband. Accordingly, at block 814, the UE may configure the first subband and the second subband using the configuration information received.

The base station 804 may transmit TPMI mapping information 816. The UE 802 may receive the TPMI mapping information 816. The TPMI mapping information may indicate a mapping between a received TPMI (e.g. wideband TPMI) and a set of TPMIs (e.g. re-interpreted or subband TPMIs). Accordingly, using the TPMI mapping information, a UE may determine sets of TPMIs from a received TPMI.

The UE 802 may transmit a scheduling request (SR) for an uplink grant 818. The base station 804 may receive the SR for the uplink grant 818. Accordingly, the base station may respond to the SR for the uplink grant. For example, the base station 804 may transmit a TPMI 820 associated with a first set of coherent physical antennas and a second set of coherent physical antennas. The UE 802 may receive the TPMI 820 associated with the first set of coherent physical antennas and the second set of coherent physical antennas. In an aspect, the base station 804 may transmit an uplink grant (e.g. DCI) in response to the SR with the PUSCH allocation. The UE 802 may receive the uplink grant including the PUSCH allocation in response to the SR. The uplink grant may include the received TPMI.

At block 822, the UE 802 may determine a set of TPMIs based on the received TPMI. The set of TPMIs may include at least one TPMI different from the received TPMI. For example, the UE may determine the first TPMI and the second TPMI of the set of TPMIs based on at least one of (1) a pre-specified sequence, (2) a cycled state of the pre-specified sequence, (3) a slot index associated with the transmissions on the first physical antenna and the second physical antenna, (4) a hybrid automatic repeat request (HARQ) ID, or (5) an ID of the UE, as indicated at 824.

At 826, the UE 802 may determine a transmission (TX) power for transmitting from the first physical antenna and the second physical antenna. For example, the UE 802 may be preconfigured with a setting for the UE's transmit power. At 828, the UE 802 may determine whether the TX power is less than a TX power threshold (e.g. a PA limit). For example, the UE may compare the determined transmit power to the threshold and select to apply the received TPMI (wideband TPMI) if the TX power is less than the TX power threshold, or to apply the set of TPMI (subband TPMIs) if the TX power meets the TX power threshold.

At 830, the UE 802 may determine a subband size of the first subband and the second subband for transmitting from the first physical antenna and the second physical antenna. For example, the subband size may be set at the UE based on RRC messaging. At 832, the UE 802 may determine whether the subband size is greater than or equal to a threshold. For example, the determined subband size may be compared to the threshold, and the UE may select to apply the received TPMI (wideband TPMI) if the determined subband size is less than the threshold, or to apply the set of TPMI (subband TPMIs) if the subband size is greater than or equal to the threshold.

At 834, the UE 802 may transmit, based on a first TPMI of the set of TPMIs, on a first physical antenna of the first set of coherent physical antennas on a first subband. At 836, the UE may transmit, based on a second TPMI of the set of TPMIs, on a second physical antenna of the first set of coherent physical antennas on a second subband different from the first subband. In an aspect, the transmitting based on the set of TPMIs (subband TPMIs) may be based on the TX power meeting a TX power threshold, as determined at 828. In an aspect, the transmitting from the first physical antenna and the second physical antenna may alternatively be based on the received TPMI (wideband TPMI) when the subband size is less than the threshold, as determined at 832.

At 838, the UE 802 may transmit, subsequently, based on a first TPMI of the set of TPMIs, on a first physical antenna of the first set of coherent physical antennas on a third subband. At 840, the UE 802 may transmit, subsequently, based on a second TPMI of the set of TPMIs, on a second physical antenna of the first set of coherent physical antennas on a fourth subband different from the third subband. The third subband and the fourth subband may both be different from the first subband and the second subband. The subsequent transmissions on the third and fourth subbands may also be concurrent in time with the transmissions on the first subband and the second subband.

Figure 9:
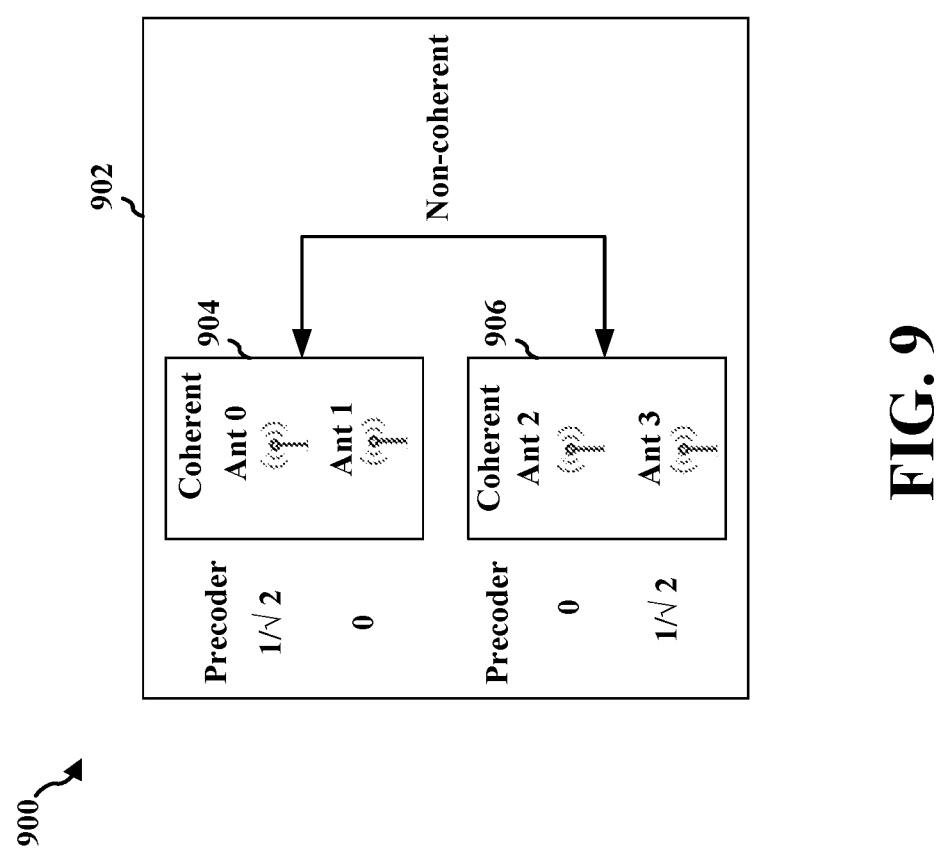
FIG. 9 illustrates an example of a wireless communication device having partial coherent antennas.

FIG. 9 illustrates an example 900 of a wireless communication device 902 having partial coherent antennas. The wireless communication device 902 may correspond to the wireless communication device 502 of FIG. 5. For example, a first set of antennas 904 is coherent. Thus, Ant 0 and Ant 1 in set 904 are capable of maintaining a relative phase difference between each other over time. Similarly, a second set of antennas 906 is coherent, with Ant 2 and Ant 3 being capable of maintaining a relative phase difference between each other over time. However, the first set of coherent antennas 904 is non-coherent to the second set of coherent antennas 906. For example, the wireless communication device 902 may not maintain phase coherence between Ant 0 in set 904 and Ant 2 in set 906, and similarly may not maintain phase coherence between Ant 1 in set 904 and Ant 3 in set 906. In other words, the wireless communication device 902 can maintain phase coherence between antennas included in each of two antenna groups (e.g., first antenna set 904 and second antenna set 906), but may not maintain phase coherence between the two antenna groups. Therefore, the wireless communication device 902 may be described as being capable of achieving partial coherence among antenna ports of the wireless communication device or as having partial coherent antennas. The non-coherent antenna sets may be associated with different precoder values, as shown in FIG. 9. For example, Ant 0 and Ant 1 in the first coherent set 904 may be associated with precoder values of ½ and 0, respectively, while Ant 2 and Ant 3 in the second coherent set 906 may be associated with a precoder value of 0 and ½, respectively. The number of antennas shown in FIG. 9 are merely examples, a wireless communication device may include any number of sets of coherent antennas that are non-coherent with each other, whereas FIG. 9 only illustrates two sets of coherent antennas. Further, each coherent set may include any number of coherent antennas.

When a UE has multiple antennas, an allocation of RBs to the antennas may be made in the frequency domain. For example, when the UE includes two sets of antennas with each set having two antennas, as illustrated in the example of FIG. 9, an allocation of RBs to the antennas may be made in the frequency domain. The RBs may be allocated across the antennas based on a TPMI.

The TPMI may be a matrix of multipliers or weights that may be used on an information stream. For example, the multipliers may be estimates of a channel for the particular antenna (or antennas) that the multiplier is to be applied to. The multipliers may impact the power levels used for transmissions on each of the antennas. For example, as illustrated in FIG. 9, Ant 0 may have a multiplier of $1/\sqrt{2}$ and Ant 1 may have a multiplier of 0. Accordingly, Ant 0 may transmit at a power level based on some base power multiplied by $1/\sqrt{2}$. Ant 1 may transmit at a power level based on some base power multiplied by 0. Thus, in the example of FIG. 9, Ant 0 transmits and Ant 1 does not transmit during the time when the illustrated TPMI is valid. Similarly, Ant 2 may transmit at a power level based on some base power multiplied by 0. Ant 3 may transmit at a power level based on some base power multiplied by ½. Thus, in the example of FIG. 9, Ant 2 does not transmit and Ant 3 does transmit during the time when the illustrated TPMI is valid. The TPMIs may be illustrated using binary whole numbers, e.g., [0,1] and [1,0], rather than the actual multiplier, e.g., 1/√2 and 0. Thus, the TPMI for antenna set 904 may be indicated as [1,0] rather than [1/√2,0]. Similarly, the TPMI for antenna set 906 may be indicated as [0,1], rather than [0, 1/√2]. Alternatively, [1/√2, 0] and [0, 1/√2] may be used as valid TPMIs.

When a base station signals a TPMI to a UE (e.g., [0,1] or [1,0]), the TPMI may be interpreted differently. For example, UEs with antennas that may not transmit at full power due to power control may re-interpret TPMI as described above.

In one aspect, a subband may be split. For example, a first subband of the wideband may use one TPMI, e.g., [0,1] or [1,0], and a second subband of the wideband may use another TPMI, e.g., [1,0] or [0,1] respectively. The TPMIs may be opposite to each other, e.g., when the first subband uses [1,0], the second subband may use [0,1]. Similarly, when the first subband uses [0,1], the second subband may use [1,0]. Thus, each TPMI indication may result in the UE transmitting with a different TPMI on separate subbands for uplink communications. For example, assuming two TPMIs may be indicated in DCI (TPMI1 or [0, 1] and TPMI2 or [1, 0]), then when TPMI1 is indicated, the UE applies TPMI in one subband of the PUSCH allocation and TPMI2 in the other subband of the allocation.

By setting up a transmission in a portion of the bandwidth, e.g., a subband, using one TPMI and setting up a second transmission in the other portion of the bandwidth, e.g., another subband, using another TPMI, the UE may transmit across the wideband with full transmit power. For example, the power scaling implemented in power control may result in a calculated transmit power assuming a single subband using a single TPM. Accordingly, the power may be doubled as compared to a single TPMI used across both subbands. Thus, using one TPMI, transmission may be achieved using full power for the subband. Similarly, using the other TPMI, transmission may be achieved using full power for the other subband. Accordingly, one antenna may use full power in one subband and another antenna may use full power for the other subband. Thus, the device may transmit at full power across the two subbands.

Thus, in TPMI re-interpretation, a UE may set up a first transmission in one subband using one TPMI and a second transmission in another subband using another TPMI. The UE may receive a first TPMI from the base station (a wideband TPMI). The UE may reinterpret the received TPMI as two different TPMIs (subband TPMIs), e.g., the received TPMI and another TPMI or as two TPMIs distinct from the received TPMI. For example, when an invalid TPMI is received, the invalid TPMI may be interpreted as a set of valid TPMIs.

In an aspect, the TPMI re-interpretation described above may be selectively used by the UE. The TPMI re-interpretation may be selected autonomously by the UE. The UE may select to apply TPMI re-interpretation based on whether the UE reached a per power amplifier (PA) power limit or not. For example, a UE that may be capable of applying TPMI re-interpretation may select not to apply TPMI re-interpretation when the UE is at a cell center, e.g., near a base station. Conversely, the UE may select to apply TPMI re-interpretation when the UE moves to cell edge, e.g., where the UE may need to function at or near full power for a transmission to reach a base station with enough power to be received by the base station.

As described above, a UE may set up a first transmission in one subband using one TPMI and a second transmission in another subband using another TPMI to result in full transmission power, although TPMI re-interpretation may result in other advantages such as DCI overhead reduction. Generally, when a UE is set to transmit at full power, the power may be divided based on power control operation, as described herein. The division of the power may not be an issue when a full power transmission is not being selected. When less than full power is selected by the UE, the power control may ramp up the power until either a target power is reached or full power is reached. When full power is reached, TPMI reinterpretation may be employed. Once the target power is reached, the UE may transmit at that power. Thus, cutting a power level of a transmission in half may generally not be an issue when power may be increased further by the power control. For example, when a UE is close to a base station, the UE may be able to increase the power level based on power control until a target power level to complete transmissions is reached. Conversely, when the UE is far from the base station, the UE may not be able to increase the power level based on power control until the target power level to complete transmissions is reached. For example, power may already be increased to maximum power, but due to reduction of transmission power across different antennas as described above, full power may not be reached. Accordingly, TPMI re-interpretation may be used to address this issue.

TPMI mapping information may include information that indicates a mapping between a received TPMI and a set of TPMIs. A UE may receive TPMI mapping information, for example, through one of a RRC message or a MAC CE from a base station. The set of TPMIs may be determined based on the received TPMI mapping information. The UE may thus be configured with the set of TPMIs based on the RRC message or the MAC CE. The RRC message or MAC CE may indicate how each TPMI indication is mapped into TPMI bundles.

The UE may be configured to split a PUSCH allocation received in an uplink grant in subbands. For example, the UE may be configured with a particular split of the PUSCH allocation in the subbands. Assuming an example PUSCH allocation of 20 PRBs, the 20 PRBs may be split between two subbands as 10 PRBs in a first subband and 10 PRBs in a second subband, 15 PRBs in the first subband and 5 PRBs in the second subband, 5 PRBs in the first subband and 15 PRBs in the second subband, or other combinations of PRBs that add to 20 PRBs total, in various examples. Thus, a UE may receive a signal from a base station including configuration information that indicates resources, such as the number of RBs or specific RBs associated with a first subband and the number of RBs or specific RBs associated with a second subband.

As described herein, a received TPMI may be re-interpreted to a set of TPMIs. When the TPMI is re-interpreted to a set of TPMIs with corresponding subband assignments, an ordering for the TPMIs may be used. For example, when a TPMI such as [0,1] is received, the TPMI ([0,1]) may be re-interpreted as two TPMIs [0,1] and [1,0]. The order that the two TPMIs that are applied to antenna ports may be, for example, pre-specified orders such as [0,1] [1,0] or [1,0] [0,1]. Accordingly, the UE may cycle through the set of TPMIs, applying the TPMIs to corresponding antenna ports using one of the two specified orders (e.g., in a two TPMI example). Furthermore, the pre-specified orders may be changed or cycled.

In another example, for a non-coherent UE with four transmitters, when a PUSCH allocation is 20 PRBs, the PRBs may be split to four groups of 5 PRBs each. Four precoders may be cycled on the four subbands. The four precoders may be cycled on the four subbands using a pre-specified sequence. For example, the four precoders may be [1,0,0,0], [0,1,0,0], [0,0,1,0], [0,0,0,1]). The four precoders may be used on four antenna ports in any order as long as a precoder is not repeated during a given pre-specified sequence. The pre-specified sequence may be determined in advance. In other aspects, the pre-specified sequence may depend on slot index, HARQ ID, or UE ID, some other identifier, or some combination of these. For example, some mathematical function may be performed on slot index, HARQ ID, or UE ID, some other identifier, or some combination of these to generate the precoders. The mathematical function may be any mathematical function that generates a non-repeating sequence (e.g. non-repeating over the sequence, although the sequence itself may repeat). For example, some mathematical function may be used to generate the sequence [1,0,0,0], [0,1,0,0], [0,0,1,0], [0,0,0,1] from slot index, HARQ ID, or UE ID, some other identifier, or some combination of these. The precoders may be applied to antenna ports in that order or any other non-repeating order.

In some instances, a TPMI that was valid for one version of a communication standard may not be valid for another version of the communication standard or a different communication standard on which, for example, a UE may be capable of communicating. Accordingly, a device may receive a TPMI that is not valid. A TPMI that is not valid, i.e., an invalid TPMI, may be reinterpreted to one or more valid TPMI according to TPMI re-interpretation as described above.

Similarly, in some instances, a TPMI that may be valid for UEs with coherent and/or partially coherent antennas may not be valid for a UE with non-coherent antennas. In some instances a TPMI may not be valid for a UE with partially coherent antennas. However, such a TPMI that is valid for coherent antennas (e.g., of a UE with MIMO capability) may in some instances be received by a UE with non-coherent antennas. Accordingly, a device such as a UE with non-coherent antennas may receive a TPMI that is not valid for that device. For example, a UE with UL MIMO capability and non-coherent or partially coherent antennas may receive an invalid TPMI. The invalid TPMI may be reinterpreted to one or more valid TPMI according to TPMI re-interpretation as described above.

For example, a TPMI of [1,1] may indicate that the two antenna ports of a UE may be used for transmission. Such a TPMI may be valid for a UE that has two antenna ports which are coherent. Accordingly, both antenna ports may be used for transmissions at the same time. A UE with coherent antennas that receives a TPMI of [1,1] may therefore apply that TPMI to transmissions and transmit on both antenna ports. However, for a UE with two non-coherent antennas which may not transmit at the same time, the TPMI [1,1] may be invalid. Accordingly, transmitting on both non-coherent antenna ports may not be a valid function and the TPMI [1,1] is not a valid TPMI for the UE. The TPMI that is not valid, i.e., the invalid TPMI, may be reinterpreted to one or more valid TPMI (e.g. [0, 1] or [1, 0]) as described above.

Furthermore, when an invalid TPMI is re-interpreted, the TPMI may be re-interpreted as a set of TPMIs, e.g., a TPMI bundle. For example, for a non-coherent UE with two transmitters or two antenna ports, as discussed above, the TPMI [1,1] may not be valid. The TPMI [1,1] generally may not be signaled. For some cases, the TPMI [1,1] may be signaled to enable the sub-band precoding and full transmit power, as described herein, whereas the TPMIs [0,1] and [1,0] still have the same behavior as in some cases.

In an aspect, when a PUSCH allocation is expected to be split into some number of subbands, e.g., X subbands, when the total allocation is smaller than a threshold (e.g., three RBs or another number), the UE may determine not to re-interpret TPMI. For example, for the case when the total allocation is smaller than a threshold, the TPMI that is applied may be the received TPMI. In such case, the UE may not perform TPMI re-interpretation from a received TPMI to a set of TPMIs, since TPMI re-interpretation in cases when the total allocation is smaller than such threshold may result in a high imbalance of RBs transmitted across the antennas. For example, with three RBs used for transmissions, when TPMI re-interpretation occurs, the result may be two TPMIs with one TPMI being used for two RBs on one antenna and another TPMI being used for one RB on another antenna. Accordingly, re-interpretation may result in an imbalance of two RBs to one RB. A one RB imbalance where the total number of RBs is only three may be considered a high imbalance. Accordingly, the imbalance of one RB is a high percentage imbalance when compared to the total RBs and to the RBs used on each antenna port, e.g., one RB imbalance compared to two RBs or one RB over the antenna ports. As the total number of RBs is increased, e.g., 5, 7, 9, etc., the imbalance percentage difference decreases. For example, with nine RBs are split across two antenna ports, an imbalance of one RB may result when the split is 5 RBs and 4 RBs, which may not be considered a high imbalance. In such case, TPMI reinterpretation may still occur.

In another aspect, when the PUSCH allocation is B RBs, and there are X subbands, each TPMI may be applied on floor(B/X) subbands for all except the last one which uses B−(X−1)*floor(B/X). When the difference floor(B/X) minus (B−(X−1)*floor(B/X)) is larger than a threshold, then the UE may determine to apply wideband TPMI and TPMI re-interpretation may not be used. As an example, if the PUSCH allocation is 22 RBs and there are 4 subbands, three subbands may be allocated 5 RBs and the fourth subband may be allocated 7 RB. In such case, if the configured threshold is 1 RB, the UE may apply wideband TPMI and refrain from re-interpreting TPMI since the difference (7 RBs−5 RBs) is larger than the configured threshold (e.g. 1 RB). As a result, an imbalance of power that may result from applying the same split power to different RB allocations in subbands may be prevented.

In some aspects, different UEs may have different capabilities. For example, UEs used on different communication systems may have different capabilities. UE capabilities may vary based on how many subbands may be used, the minimum size of each subband, the maximum difference in the size between any two subbands, and/or other UE capabilities.

Figure 10:
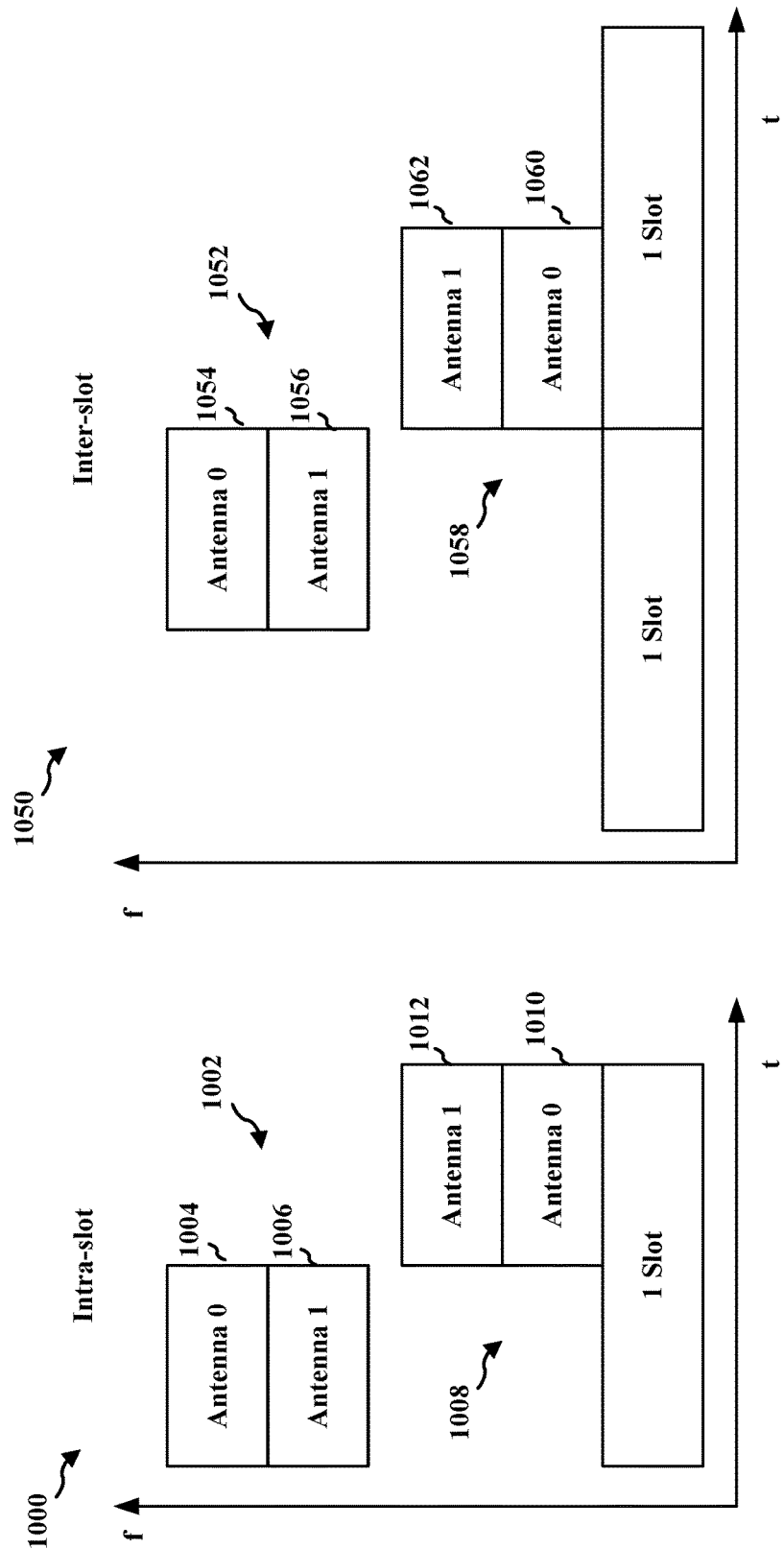
FIGS. 10A and 10B illustrate examples of intra-slot and inter-slot frequency hopping, respectively.

FIG. 10A illustrates an example of intra-slot frequency hopping 1000. FIG. 10B illustrates an example of inter-slot frequency hopping 1050. A UE may be configured to transmit over multiple, e.g., two, frequency allocations of a PUSCH. The transmissions may be over the span of a sequence of OFDM symbols. Transmitting over multiple frequency allocations of a PUSCH (e.g. over the span of a sequence of OFDM symbols) may be referred to as frequency hopping.

When a UE is configured for frequency hopping, e.g., either intra-slot (FIG. 10A) or inter-slot (FIG. 10B), the antennas used may cycle between the subbands. For example, FIG. 10A illustrates a first frequency range 1002 for possible transmissions of antenna 0 1004 and antenna 1 1006. Antenna 0 and/or antenna 1, within frequency range 1002, may transmit depending on the values in the precoding matrix indicated from re-interpreted TPMI. A second frequency range 1008 for possible transmissions of antenna 0 1010 and antenna 1 1012 is illustrated as well in FIG. 10A, but where the ordering of the antennas has changed. Initially, antenna 0 1004 was on a higher range of frequencies than antenna 1 1006 within the first frequency range 1002, while antenna 0 1010 is on a lower range of frequencies than antenna 1 1012 within the second frequency range 1008. However, frequency hopping may not require the changes illustrated in the specific example of FIG. 10A. Rather, many different combinations of frequency changes over time are possible. Antenna 0 and/or antenna 1, within frequency range 1008, may transmit depending on the values in the precoding matrix indicated from re-interpreted TPMI. In an aspect, the first TPMI and the second TPMI may be applied on the first subband and the second subband of frequency range 1002 respectively as an initial frequency. After a frequency hop, the second TPMI and the first TPMI may be applied on the first and second subband of frequency range 1008, respectively.

FIG. 10B illustrates a first frequency range 1052 for possible transmissions of antenna 0 1054 and antenna 1 1056. Antenna 0 and/or antenna 1, within frequency range 1052, may transmit depending on the values in the precoding matrix indicated from re-interpreted TPMI. A second frequency range 1058 for possible transmissions of antenna 0 1060 and antenna 1 1062 is also illustrated where the ordering of the antennas has changed. Initially, antenna 0 1054 was on a higher range of frequencies than antenna 1 1056 within the first frequency range 1052, while antenna 0 1060 is on a lower range of frequencies than antenna 1 1062 within the second frequency range 1058. However, frequency hopping may not require the changes illustrated in the specific example of FIG. 10B. Rather, many different combinations of frequency changes over time are possible. Antenna 0 and/or antenna 1, within frequency range 1058, may transmit depending on the values in the precoding matrix indicated from re-interpreted TPMI. In an aspect, the first TPMI and the second TPMI may be applied on the first subband and the second subband of frequency range 1052 respectively as an initial frequency. After a frequency hop, the second TPMI and the first TPMI may be applied on the first and second subband respectively of frequency range 1058.

Figure 11:
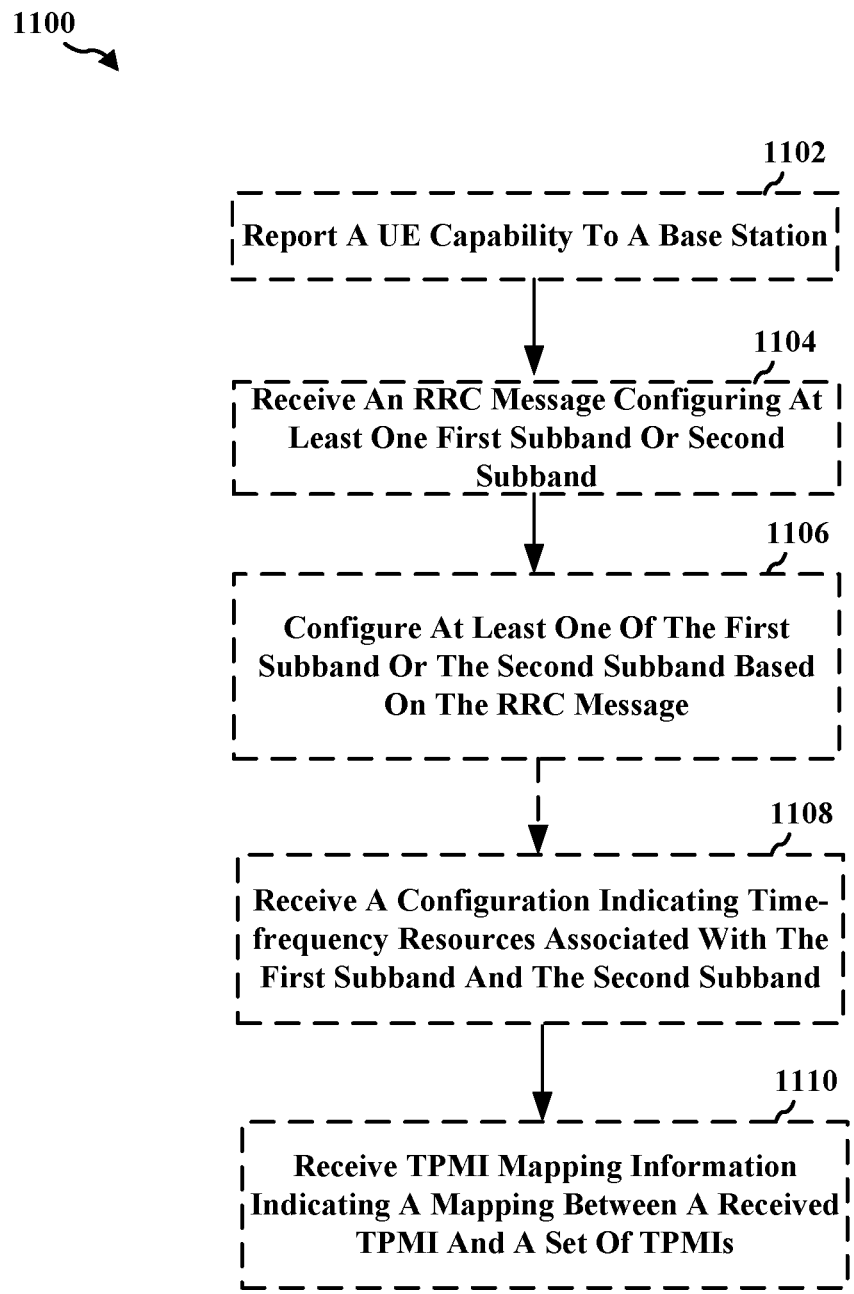
FIG. 11 is a flowchart of a method of wireless communication.

FIG. 11 is a flowchart 1100 of a method of wireless communication. The method may be performed by a UE (e.g., the UE 104, 350, 402, 502, 802, 902; the apparatus 1302/1302'; the processing system 1414, which may include the memory 360 and which may be the entire UE 350 or a component of the UE 350, such as the TX processor 368, the RX processor 356, and/or the controller/processor 359). Optional aspects are illustrated in dashed lines. The method allows a UE to perform TPMI re-interpretation of a TPMI received from a base station (e.g. the base station 102/180, 310, 804, 1350).

At 1102, the UE may report a UE capability to a base station. The UE capability may indicate at least one of a number of subbands including at least one first subband and at least one second subband, a minimum size for a subband of the at least one first subband and the at least one second subband, or a maximum difference in size between a pair of subbands of the at least one first subband and the at least one second subband. For example, 1102 may be performed by a report UE capability component of transmission component 1314. For example, referring to FIG. 8, the UE 802 may report the UE's capability 806 to a base station 804. That is, the UE 802 may transmit a report to the base station 804 that provides UE capability information on one or more of (1) how many subbands exist, (2) a minimum size of each subband, or (3) a maximum difference in size between any two subbands. Providing the UE capabilities to the base station 1350 may allow the base station 1350 to configure the UE with the subbands for TPMI re-interpretation.

At 1104, the UE may receive an RRC message. For example, 1104 may be performed by the RX RRC component of reception component 1304. The RRC message may configure the at least one first subband and the at least one second subband. Moreover, the RRC message may indicate how each TPMI indication is mapped into TPMI bundles, e.g., different groups or sets of TPMIs. For example, referring to FIG. 8, the UE 802 may receive a RRC message 808 from the base station 804 including information for configuring the subbands. For instance, the base station may configure the UE with respect to how the PUSCH allocation is to be split in different subbands. For example, if the base station schedules an allocation of PUSCH resources (e.g. in DCI) to the UE of 20 PRBs, the base station may configure the UE to split the PUSCH allocation equally (e.g. 10 PRBs in one subband and 10 PRBs in another subband) or unequally (e.g. 5 PRBs in one subband and 15 PRBs in another subband).

At 1106, the UE may configure the at least one first subband and the at least one second subband based on the RRC message. For example, 1106 may be performed by configuration component 1312. Using the RRC message, the UE can determine how each TPMI indication is mapped into TPMI bundles, e.g., groups of TPMIs. The UE may configure at least one of the first subband or the second subband based on the RRC message by determining mapping from the RRC message, and using the mapping to determine a number of needed subbands and selected subbands from available frequency ranges, for example. For instance, referring to FIG. 8, at block 810, the UE 802 may configure at least one of the first subband or the second subband based on the RRC message 808. For example, when the UE receives a PUSCH allocation of RBs, the UE may split the subbands among RBs with an equal or near equal distribution. For instance, assuming a PUSCH allocation of B RBs over X subbands, the UE may select as a number of RBs for each subband to be floor(B/X), with any remainder of RBs being in the last subband. Thus, a PUSCH allocation of 20 RBs for a TPMI bundle of 4 TPMIs may be split equally into four subbands of 5 RBs each, while a PUSCH allocation of 22 RBs for the same TPMI bundle may be split into three subbands of 5 RB and one subband of 7 RB.

At 1108, the UE may receive a configuration indicating time-frequency resources associated with the first subband and the second subband. For example, 1108 may be performed by RX configuration component of the reception component 1304. The configuration information may include information with respect to how to split the PUSCH allocation in subbands, e.g., for 20 PRBs, splits may include, but are not limited to 10 PRBs and 10 PRBs, 15 PRBs and 5 PRBs, 5 PRBs and 15 PRBs, or other combinations that add to 20 PRBs. For example, referring to FIG. 8, the UE 802 may receive a configuration 812 from the base station 804 indicating time-frequency resources associated with the first subband and the second subband. For instance, the configuration 812 may include slots and/or symbols and RBs corresponding to the different subbands of a PUSCH allocation for the UE.

At 1110, the UE may receive TPMI mapping information indicating a mapping between the received TPMI and the set of TPMIs. For example, 1110 may be performed by the RX TPMI mapping component of the reception component 1304. The TPMI mapping information may be received through one of a RRC message or a MAC-CE. The mapping information may indicate how one or more TPMIs each map to bundles, groups, or sets of TPMIs. For example, referring to FIG. 8, the UE 802 may receive TPMI mapping information 816 from the base station 804. The TPMI mapping information may indicate a mapping between a received TPMI (e.g. wideband TPMI) and a set of TPMIs (e.g. re-interpreted or subband TPMIs). For instance, referring to FIGS. 4 and 5, the base station may configure the UE with respect to how each TPMI indication (received TPMI) is mapped into TPMI bundles for re-interpretation, e.g., in a RRC message or a MAC-CE. For example, if the UE has two non-coherent antennas such as illustrated in FIG. 4, the UE may be configured via RRC or MAC-CE with a mapping that a received TPMI of [0, 1] may correspond to the following example TPMI bundle: [1, 0] for the first subband and [0, 1] for the second subband. Thus, the UE may re-interpret the TPMI such that it applies [1, 0] for one subband of a PUSCH allocation (e.g. one half of the total bandwidth) and [0, 1] for the other subband of the PUSCH allocation (e.g. the other half of the total bandwidth). In another example, if the UE has two partially coherent sets of non-coherent antennas such as illustrated in FIG. 5 (four antennas total), the UE may be configured by the base station with a mapping that a received TPMI of [1, 1, 0, 0] may correspond to the following example TPMI bundle: [1, 0, 1, 0] for a first subband, [0, 1, 0, 1] for a second subband, [0, 1, 1, 0] for a third subband, and [1, 0, 0, 1] for a fourth subband. The number of subbands may be equal to the number of antennas.

Figure 12:
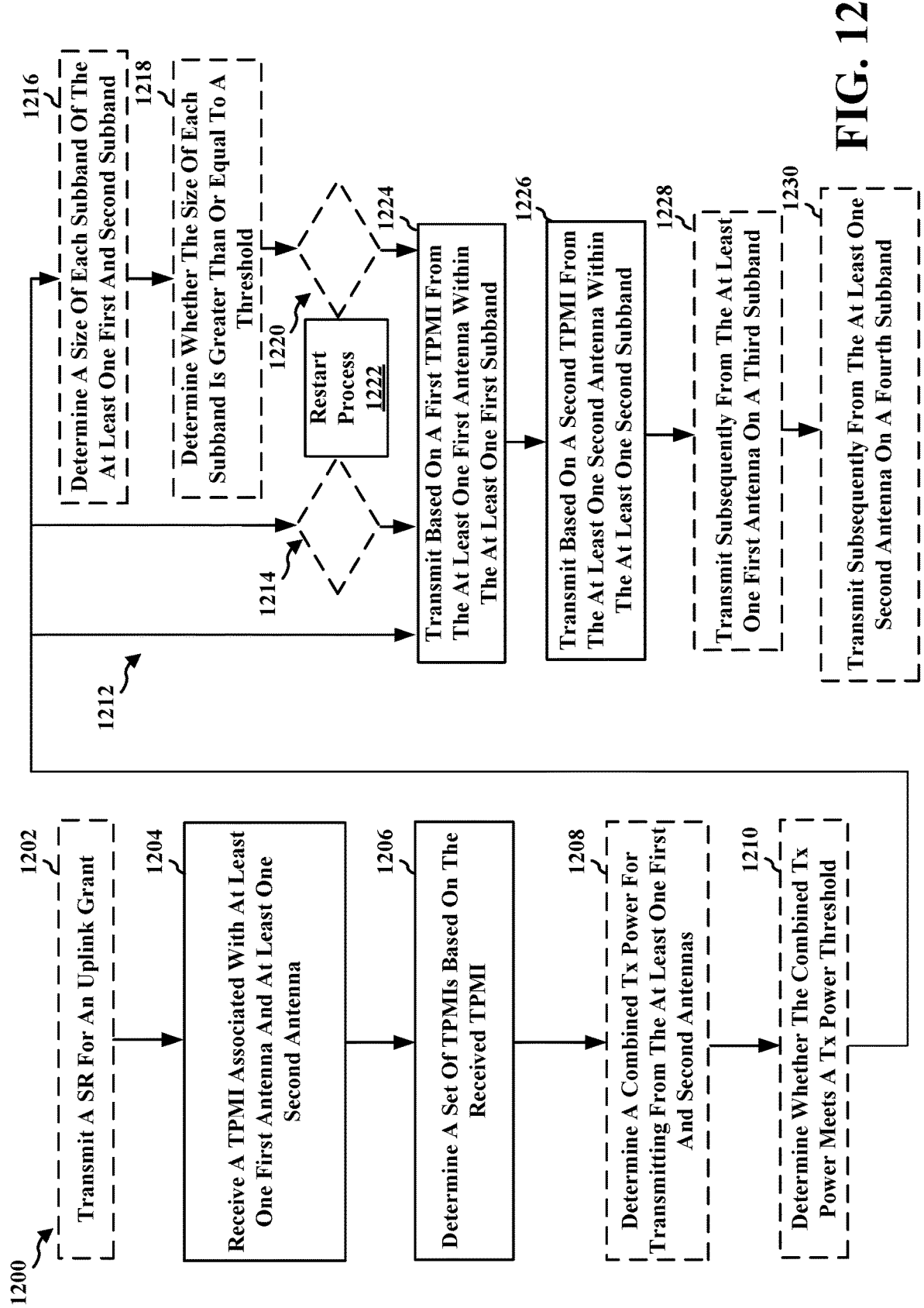
FIG. 12 is another flowchart of a method of wireless communication.

FIG. 12 is a flowchart 1200 of a method of wireless communication. The method may be performed by a UE (e.g., the UE 104, 350, 402, 502, 802, 902; the apparatus 1302/1302'; the processing system 1414, which may include the memory 360 and which may be the entire UE 350 or a component of the UE 350, such as the TX processor 368, the RX processor 356, and/or the controller/processor 359). Optional aspects are illustrated in dashed lines. The method continues from FIG. 11 in allowing a UE to perform TPMI re-interpretation of a TPMI received from a base station (e.g. the base station 102/180, 310, 804, 1350).

At 1202, the UE may transmit a SR for an uplink grant. For example, 1202 may be performed by SR UL grant component of transmission component 1314. The SR for the uplink grant may signal the base station to transmit a TPMI, e.g., as part of a response to the SR (e.g. in an uplink grant). The at least one first subband and the at least one second subband may be divisions of a PUSCH resource allocation in the uplink grant. For example, referring to FIG. 8, the UE 802 may transmit an SR for an uplink grant 818, and the base station 804 may transmit to the UE an uplink grant (e.g. DCI) in response to the SR with the PUSCH allocation. The uplink grant may include the received TPMI 820.

At 1204, the UE receives a TPMI associated with at least one first antenna and at least one second antenna. The at least one first antenna and the at least one second antenna are non-coherent with each other. For example, 1204 may be performed by RX TPMI component of the reception component 1304. The TPMI may be received in the uplink grant in response to the SR transmitted at 1202. The TPMI information may be applied to the antenna configuration of the UE to determine antennas where transmissions will occur. For example, referring to FIG. 8, the UE 802 may receive a TPMI 820 from the base station 804 in response to the SR for the uplink grant 818. Moreover, referring to FIGS. 4 and 5, the TPMI may be associated with at least one first antenna (e.g. Ant 0 in FIG. 4, or Ant 0 and/or 1 in FIG. 5) and at least one second antenna (e.g. Ant 1 in FIG. 4, or Ant 2 and/or 3 in FIG. 5) which are non-coherent with each other. For example, with respect to FIG. 4, a received TPMI of [0, 1] may result in Ant 0 not transmitting and Ant 1 transmitting at half power across a PUSCH allocation, and with respect to FIG. 5, a received TPMI of [0, 0, 1, 1] may result in Ants 0 and 1 not transmitting and Ants 2 and 3 transmitting at half power combined across a PUSCH allocation.

At 1206, the UE determines a set of TPMIs based on the received TPMI. The set of TPMIs include at least one TPMI different from the received TPMI. For example, 1206 may be performed by determine set of TPMI component 1306. For example, the set of TPMIs may be determined based on at least one of a pre-specified sequence, a cycled state of the pre-specified sequence, a slot index, a HARQ ID, or an ID of the UE. The set of TPMIs may be determined based on the received mapping information at 1110. For example, the set of TPMIs may be determined by applying a received TPMI to a mapping of a received TPMI to a set of TPMIs and determining the set of TPMIs from the mapping. For instance, referring to FIG. 8, at block 822, the UE 802 may determine a set of TPMIs based on the received TPMI. In on example, the set of TPMIs may be determined based on TPMI mapping information 816. For instance, referring to FIG. 4, the UE may determine from the mapping that a received TPMI of [0, 1] may correspond to the following example TPMI bundle: [1, 0] for the first subband and [0, 1] for the second subband. Similarly, referring to FIG. 5, the UE may determine from the mapping that a received TPMI of [1, 1, 0, 0] may correspond to the following example TPMI bundle: [1, 0, 1, 0] for a first subband, [0, 1, 0, 1] for a second subband, [0, 1, 1, 0] for a third subband, and [1, 0, 0, 1] for a fourth subband. Moreover, referring back to FIG. 8, in another example, the UE 802 may determine the first TPMI and the second TPMI of the set of TPMIs based on at least one of (1) a pre-specified sequence, (2) a cycled state of the pre-specified sequence, (3) a slot index associated with the transmissions on the first physical antenna and the second physical antenna, (4) a HARQ ID, or (5) an ID of the UE, as indicated at 824.

At 1208, the UE may determine a combined Tx power for transmitting from the at least one first antenna and the at least one second antenna. For example, 1208 may be performed by the TX power component of the determination component 1310. The TX power may be determined by, for example, receiving or reading a TX power setting and using the reported result for further processing, e.g., at 1210. For example, referring to FIG. 8, at 826, the UE 802 may determine a Tx power for transmitting from a first physical antenna and a second physical antenna. For example, the UE 802 may be preconfigured with a setting for the UE's transmit power.

At 1210, the UE may determine whether the combined Tx power meets a TX power threshold. For example, 1210 may be performed by TX power threshold component of the determination component 1310. For example, the UE may get the result at 1208 and compare the result to the threshold. The UE may transmit from the at least one first antenna based on the first TPMI, and from the at least one second antenna based on the second TPMI, when the combined Tx power meets the Tx power threshold. Alternatively, the UE may transmit from the at least one first antenna and the at least one second antenna based on the received TPMI when the combined Tx power does not meet the Tx power threshold. For example, referring to FIG. 8, at 828, the UE 802 may determine whether the TX power is less than a TX power threshold (e.g. a PA limit). For example, the UE may compare the determined transmit power to the threshold and select to apply the received (wideband) TPMI if the TX power is less than the TX power threshold, or to apply the set of (subband) TPMI if the TX power meets the TX power threshold. Moreover, referring to FIGS. 4 and 5, if the UE has non-coherent antennas or partially coherent antennas, the UE may determine whether to re-interpret a received TPMI or not based on a location of the UE. For instance, if the UE is located near a base station at the center of the cell, the UE may be below the PA limit and determine not to re-interpret TPMI, while if the UE is at a cell edge, the UE may have reached the PA limit and may determine to re-interpret TPMI.

At 1216, the UE may determine a size of each subband of the at least one first subband and the at least one second subband. For example, 1216 may be performed by the subband size component of the determination component 1310. For example, subband size may be based on determining available frequency ranges and applying the number of subbands needed to the frequencies available for use as subbands. For instance, referring to FIG. 8, at 830, the UE 802 may determine a subband size of the first subband and the second subband for transmitting from the first physical antenna and the second physical antenna. For example, the subband size may be set at the UE based on RRC messaging. For instance, if the base station schedules an allocation of PUSCH resources (e.g. in DCI) to the UE of 20 PRBs, the base station may configure the UE to split the PUSCH allocation equally (e.g. 10 PRBs in one subband and 10 PRBs in another subband) or unequally (e.g. 5 PRBs in one subband and 15 PRBs in another subband). In another example, the UE may determine the size of each subband based on a number of TPMIs in a TPMI bundle or a number of antennas of the UE. The subbands may also be split among RBs with an equal or near equal distribution. For example, assuming a PUSCH allocation of B RBs over X subbands, the number of RBs for each subband may be floor(B/X), with any remainder of RBs being in the last subband. Thus, a PUSCH allocation of 20 RBs for a TPMI bundle of 4 TPMIs may be split equally into four subbands of 5 RBs each, while a PUSCH allocation of 22 RBs for the same TPMI bundle may be split into three subbands of 5 RB and one subband of 7 RB.

At 1218, the UE may determine whether the size of each subband is greater than or equal to a threshold. For example, 1218 may be performed by the subband size threshold component of the determination component 1310. The UE may transmit from the at least one first antenna based on the first TPMI and from the at least one second antenna based on the second TPMI when the size of each subband is greater than or equal to the threshold. Alternatively, the UE may transmit from the at least one first antenna and from the at least one second antenna based on the received TPMI when the size of one or more of the at least one first subband and the at least one second subband is less than the threshold. For example, referring to FIG. 8, at 832, the UE 802 may determine whether the subband size is greater than or equal to a threshold. For example, the determined subband size may be compared to the threshold, and the UE may select to apply the received TPMI (wideband TPMI) if the determined subband size is less than the threshold, or to apply the set of TPMI (subband TPMIs) if the subband size is greater than or equal to the threshold.

In another example, when the total size of all subbands is smaller than a threshold (e.g. 3 RBs), or when the difference in size between two subbands is greater than the threshold, the UE may refrain from re-interpreting TPMI and instead use the received TPMI for all subbands in order to prevent a high imbalance across the antennas. As an example, if the PUSCH allocation is 22 RBs and there are 4 subbands, three subbands may be allocated 5 RBs and the fourth subband would be allocated 7 RB. In such case, if the configured threshold is 3 RBs, the UE may apply re-interpreted TPMI since the difference (e.g. 7 RBs–5 RBs) is less than the threshold (e.g. 3 RBs). Alternatively, if the configured threshold is 1 RB, the UE may apply wideband TPMI and refrain from re-interpreting TPMI since the difference (7 RBs–5 RBs) is greater than the configured threshold (e.g. 1 RB).

Where optional steps 1208, 1210, 1216, and 1218 are skipped, then as indicated by 1212, the UE may proceed directly to step 1224 below. Otherwise, if the UE performs steps 1208 and 1210, then at 1214, the UE may determine whether to transmit from the at least one first antenna based on the first TPMI and from the at least one second antenna based on the second TPMI, or alternatively based on the received TPMI, based on the combined Tx power as described above. Similarly, if the UE performs steps 1216 and 1218, then at 1220, the UE may determine whether to transmit from the at least one first antenna based on the first TPMI and from the at least one second antenna based on the second TPMI, or alternatively based on the received TPMI, based on the subband size as described above. In certain cases, at 1222, the process may restart from 1202 for instances where the transmissions using TPMI re-interpretation are not used (e.g. when the UE decides to transmit based on the received TPMI rather than the set of TPMIs). Alternatively, various transmissions may be made without using TPMI re-interpretation.

At 1224, the UE transmits, based on a first TPMI of the set of TPMIs, from the at least one first antenna within the at least one first subband. For example, 1224 may be performed by the TX first subband component of the transmission component 1314. Moreover, at 1226 the UE transmits, based on a second TPMI of the set of TPMIs, from the at least one second antenna within the at least one second subband different from the at least one first subband. For example, 1226 may be performed by the TX second subband component of the transmission component 1314. For instance, referring to FIG. 8, at 834, the UE 802 may transmit, based on a first TPMI of the set of TPMIs, on a first physical antenna of the first set of coherent physical antennas on a first subband, and at 836, the UE may transmit, based on a second TPMI of the set of TPMIs, on a second physical antenna of the second set of coherent physical antennas on a second subband different from the first subband. For example, referring to FIG. 4, if the UE receives a TPMI of [0, 1], the UE may re-interpret the TPMI as [1, 0] for the first subband and [0, 1] for the second subband of the PUSCH allocation. Thus, the UE may have Ant 1 transmit at half power across the first subband, and Ant 0 transmit at half power across the second subband, such that full power is transmitted in combination across both subbands.

The at least one first antenna and the at least one second antenna may be switched between the at least one first subband and the at least one second subband during frequency hopping. For example, when the UE receives a TPMI for a frequency range corresponding to one hop (e.g. 10 MHz), the UE may re-interpret the TPMI as corresponding to different subbands of the hop, as described above with respect to FIGS. 10A and 10B. For instance, if the UE receives a TPMI of [0, 1], the UE may split the 10 MHz into different subbands of 5 MHz in which the UE may apply different re-interpreted TPMI (e.g. [1,0] in the first 5 MHz and [0, 1] in the second 5 MHz). Moreover, whenever the UE hops to a next frequency (including inter-slot or intra-slot), the UE may switch or cycle the antennas transmitting in the different subbands. For example, referring to FIG. 4, if the wireless communication device 402 is performing frequency hopping and receives a TPMI of [0, 1] (which corresponds to the TPMI bundle: [1, 0] and [0, 1]), Ant 0 may transmit in the first sub-band of the first hop, Ant 1 may transmit in the second sub-band of the first hop, Ant 1 may transmit in the first sub-band of the second hop, and Ant 0 may transmit in the second sub-band of the second hop.

The at least one first antenna may comprise a first set of coherent antennas and the at least one second antenna may comprise a second set of coherent antennas. Thus, at 1228, the UE may transmit subsequently, based on a first TPMI of the set of TPMIs, from the at least one first antenna on a third subband. For example, 1228 may be performed by the TX third subband component of the transmission component 1314. Moreover, at 1230, the UE may transmit subsequently, based on a second TPMI of the set of TPMIs, from the at least one second antenna on a fourth subband. For example, 1230 may be performed by the TX fourth subband component of the transmission component 1314. For instance, referring to FIG. 8, at 838, the UE 802 may transmit based on a first TPMI of the set of TPMIs, on a first physical antenna of the first set of coherent physical antennas on a third subband, and at 840, the UE 802 may transmit, based on a second TPMI of the set of TPMIs, on a second physical antenna of the second set of coherent physical antennas on a fourth subband different from the third subband. For instance, referring to FIG. 5, Ant 0 and 1 may be part of a first set of coherent physical antennas, and Ant 2 and 3 may be part of a second set of coherent physical antennas, with each of the four antennas respectively transmitting on its own subband based on re-interpreted TPMIs.

One or more of the transmissions 1224, 1226, 1228, 1230 may be based on the received TPMI on the first physical antenna and the second physical antenna when the size of at least one of the subbands is less than a threshold and/or when the combined Tx power is less than a Tx power threshold. Using the set of TPMIs for the transmissions 1224, 1226, 1228, 1230 may be referred to as TPMI re-interpretation.

Figure 13:
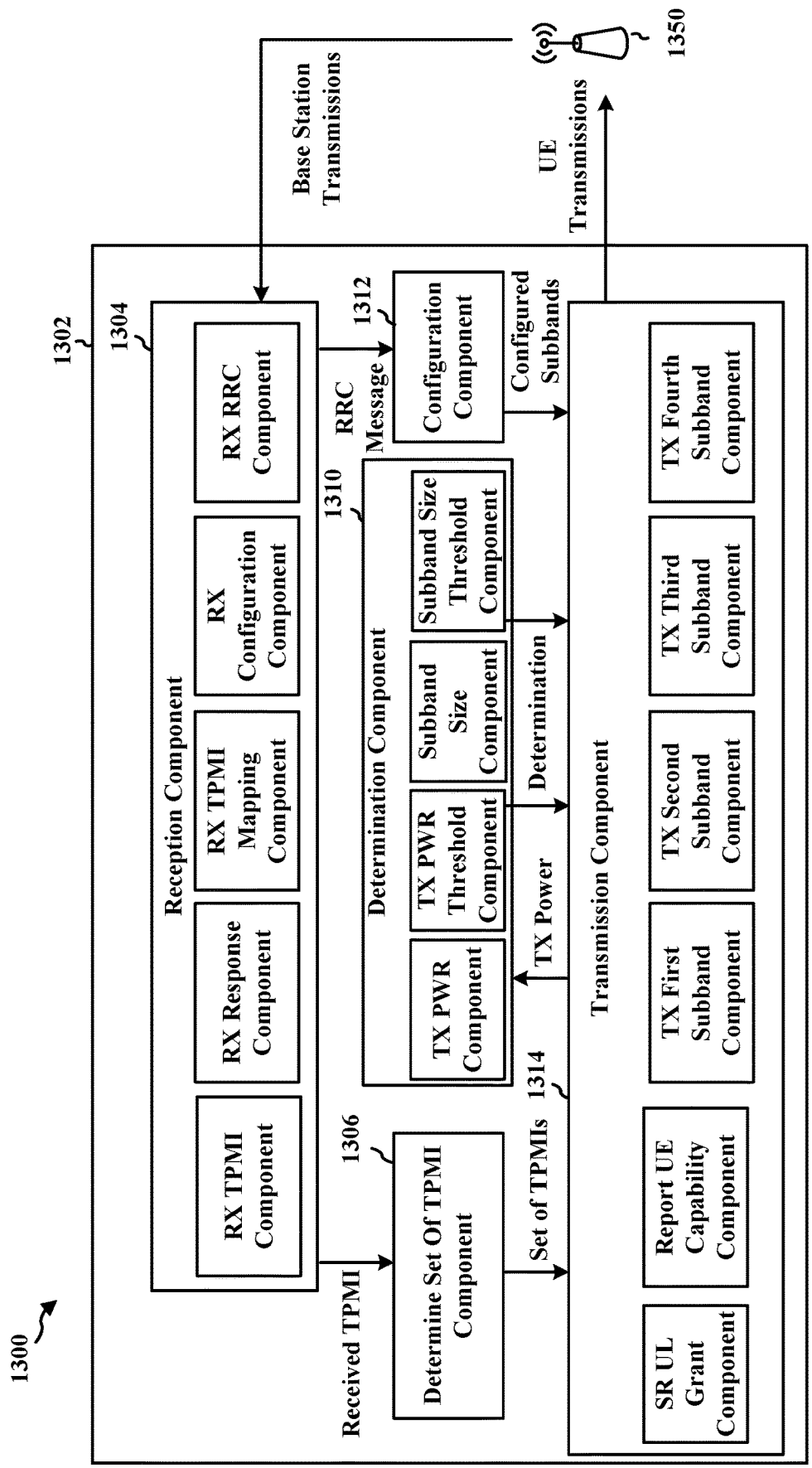
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE. The apparatus includes a reception component 1304 that receives transmissions from a base station 1350, e.g., as described in connection with 1104, 1108, 1110 of FIG. 11 and/or 1204 of FIG. 12. The apparatus includes a determine set of TPMI component 1306 that determines a set of TPMIs based on a received TPMI, e.g., as described in connection with 1206 of FIG. 12. The determination of the TPMI may be based on at least one of a pre-specified sequence, a cycled state of the pre-specified sequence, a slot index associated with the transmissions from the at least one first antenna and the at least one second antenna, a HARQ ID, or an ID of the UE. The apparatus includes a determination component 1310 that processes information and makes determinations, e.g., as described in connection with 1208, 1210, 1216, 1218 of FIG. 12. The apparatus includes a configuration component 1312 that configures the at least one of the first subband or the second subband based on a RRC message, e.g., as described in connection with 1106 of FIG. 11. The apparatus includes a transmission component 1314 that transmits signals, i.e., uplink transmissions to base station 1350, e.g., as described in connection with 1102 of FIG. 11 and/or 1202, 1224, 1226, 1228, 1230 of FIG. 12.

The reception component 1304 that receives transmissions from the base station 1350 may include sub-components, such as a RX TPMI component that receives a TPMI associated with at least one first antenna and at least one second antenna, e.g., as described in connection with 1204, a RX response component that receives an uplink grant in response to a transmitted SR request, e.g., as described in connection with 1202, a RX TPMI mapping component that receives TPMI mapping information indicating a mapping between a received TPMI and a set of TPMIs, e.g., as described in connection with 1110, a RX configuration component that receives a configuration indicating time-frequency resources associated with the at least one first and second subband, e.g., as described in connection with 1108, and/or a RX RRC component that receives an RRC message configuring at least one first subband or second subband, e.g., as described in connection with 1104.

The determination component 1310 that processes information and makes determinations may include sub-components, such as a TX power component that determines a combined Tx power for transmitting from the at least one first and second antennas, e.g., as described in connection with 1208, a TX power threshold component that determines whether the combined Tx power meets a Tx power threshold, e.g., as described in connection with 1210, a subband size component that determines a size of each subband of the at least one first and second subband, e.g., as described in connection with 1216, and/or a subband size threshold component that determines whether the size of each subband is greater than or equal to a threshold, e.g., as described in connection with 1218.

The transmission component 1314 that transmits signals, i.e., uplink transmissions, may include sub-components, such as a SR UL grant component that transmits a SR for an uplink grant, e.g., as described in connection with 1202, a report UE capability component that reports a UE capability to a base station, e.g., as described in connection with 1102, a TX first subband component that transmits based on a first TPMI from at least one first antenna within at least one first subband, e.g., as described in connection with 1224, a TX second subband component that transmits based on a second TPMI from at least one second antenna within at least one second subband, e.g., as described in connection with 1226, a TX third subband component that transmits subsequently from the at least one first antenna on a third subband, e.g., as described in connection with 1228, and/or a Tx fourth subband component that transmits subsequently from the at least one second antenna on a fourth subband, e.g., as described in connection with 1230.

The apparatus may include additional components that perform each of the blocks of the algorithm in the aforementioned flowcharts of FIGS. 11-12. As such, each block in the aforementioned flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
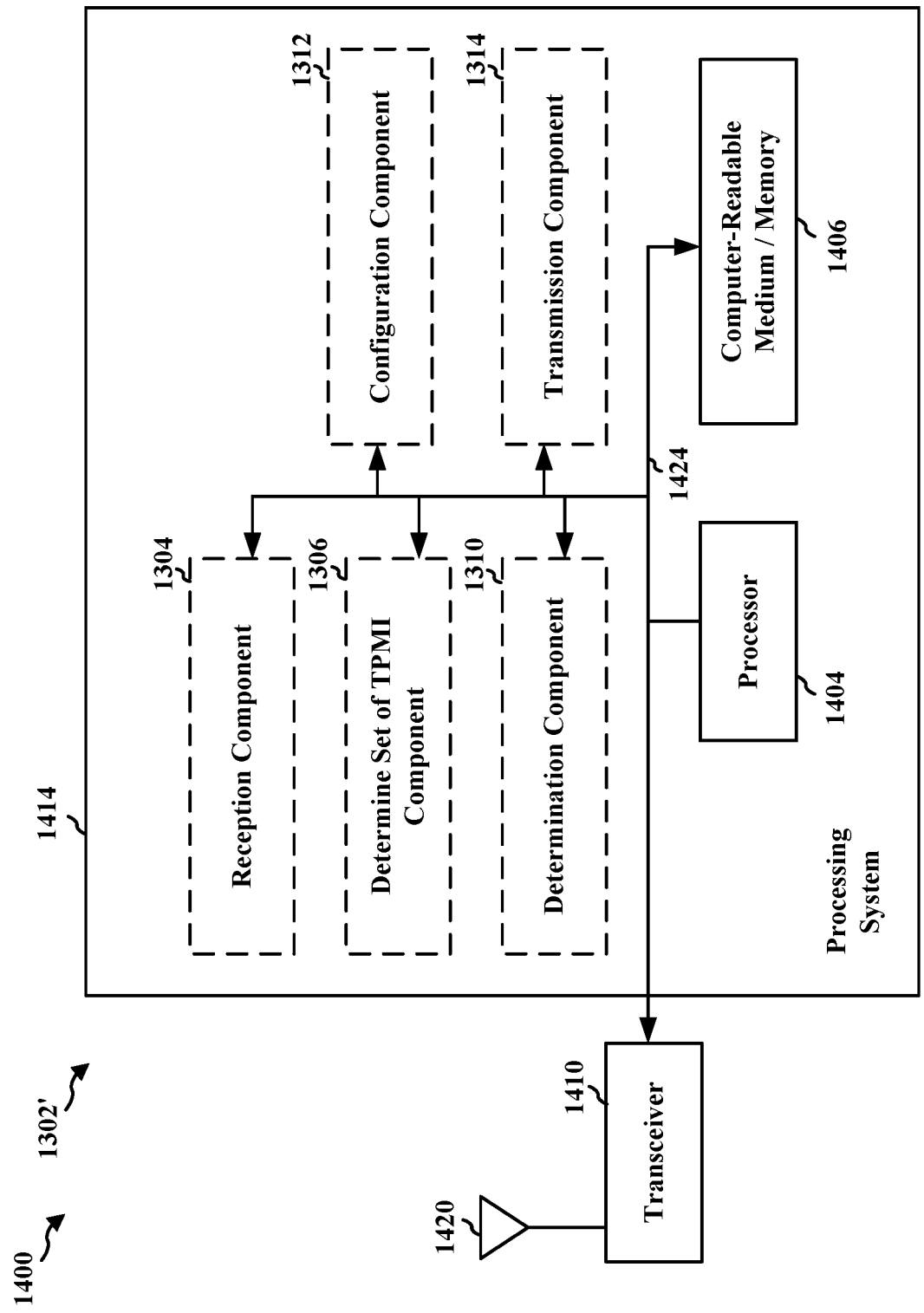
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304 (and subcomponents), 1306, 1310 (and subcomponents), 1312, 1314 (and subcomponents), and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304 (and subcomponents), 1306, 1310 (and subcomponents), 1312, 1314 (and subcomponents). The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication includes means for receiving a TPMI associated with at least one first antenna and at least one second antenna, the at least one first antenna and the at least one second antenna being non-coherent with each other; means for determining a set of TPMIs based on the received TPMI, the set of TPMIs including at least one TPMI different from the received TPMI; means for transmitting, based on a first TPMI of the set of TPMIs, from the at least one first antenna within at least one first subband; and means for transmitting, based on a second TPMI of the set of TPMIs, from the at least one second antenna within at least one second subband different from the at least one first subband.

In one configuration, the apparatus may include means for transmitting a SR for an uplink grant, where the TPMI is received in the uplink grant in response to the SR.

In one configuration, the at least one first antenna may comprise a first set of coherent antennas and the at least one second antenna comprises a second set of coherent antennas.

In one configuration, the at least one first subband and the at least one second subband may be divisions of a Physical Uplink Shared Channel (PUSCH) resource allocation.

In one configuration, the apparatus may include means for determining a combined transmission (Tx) power for transmitting from the at least one first antenna and the at least one second antenna; and means for determining whether the combined Tx power meets a Tx power threshold, wherein the transmitting from the at least one first antenna may be based on the first TPMI and the transmitting from the at least one second antenna may be based on the second TPMI when the combined Tx power meets the Tx power threshold.

In one configuration, the transmitting from the at least one first antenna and the transmitting from the at least one second antenna may be based on the received TPMI when the combined Tx power does not meet the Tx power threshold.

In one configuration, the apparatus may include means for receiving TPMI mapping information indicating a mapping between the received TPMI and the set of TPMIs, wherein the set of TPMIs is determined based on the received TPMI mapping information.

In one configuration, the TPMI mapping information may be received through one of a RRC message or a MAC-CE.

In one configuration, the apparatus may include means for receiving a RRC message configuring the at least one first subband and the at least one second subband.

In one configuration, the set of TPMIs may be determined based on at least one of a pre-specified sequence, a cycled state of the pre-specified sequence, a slot index, a HARQ identifier (ID), or an ID of the UE.

In one configuration, the apparatus may include means for reporting a UE capability to a base station, wherein the UE capability indicates at least one of: a number of subbands including the at least one first subband and the at least one second subband; a minimum size for a subband of the at least one first subband and the at least one second subband; or a maximum difference in size between a pair of subbands of the at least one first subband and the at least one second subband.

In one configuration, the apparatus may include means for determining a size of each subband of the at least one first subband and the at least one second subband; and means for determining whether the size of each subband is greater than or equal to a threshold, wherein the transmitting from the at least one first antenna is based on the first TPMI and the transmitting from the at least one second antenna is based on the second TPMI when the size of each subband is greater than or equal to the threshold.

In one configuration, the transmitting from the at least one first antenna and the transmitting from the at least one second antenna may be based on the received TPMI when the size of one or more of the at least one first subband and the at least one second subband is less than the threshold.

In one configuration, the at least one first antenna and the at least one second antenna may be switched between the at least one first subband and the at least one second subband during frequency hopping.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, the present disclosure allows UEs to re-interpret TPMI as a set of TPMIs, thereby improving transmission power and reducing DCI overhead. For example, the set of TPMIs may result in, e.g., two half power transmissions with one transmission on each of two subbands. The two ½ power transmissions on the separate two subbands result in a full power transmission, i.e., ½+½. Allowing the UE to transmit at full power may provide for better performance, e.g., when a UE is at a cell edge. When the UE is not on the cell edge, the UE may disable TPMI reinterpretation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    receiving a transmitted precoding matrix indicator (TPMI) associated with at least one first antenna and at least one second antenna, the at least one first antenna and the at least one second antenna being non-coherent with each other;
    determining a set of TPMIs based on the received TPMI, the set of TPMIs including at least one TPMI different from the received TPMI;
    transmitting, based on a first TPMI of the set of TPMIs, from the at least one first antenna within at least one first subband; and
    transmitting, based on a second TPMI of the set of TPMIs, from the at least one second antenna within at least one second subband different from the at least one first subband.

2. The method of claim 1, further comprising:
    transmitting a scheduling request (SR) for an uplink grant, wherein the TPMI is received in the uplink grant in response to the SR.

3. The method of claim 1, wherein the at least one first antenna comprises a first set of coherent antennas and the at least one second antenna comprises a second set of coherent antennas.

4. The method of claim 1, wherein the at least one first subband and the at least one second subband are divisions of a Physical Uplink Shared Channel (PUSCH) resource allocation.

5. The method of claim 1, further comprising:
    determining a combined transmission (Tx) power for transmitting from the at least one first antenna and the at least one second antenna; and
    determining whether the combined Tx power meets a Tx power threshold,
    wherein the transmitting from the at least one first antenna is based on the first TPMI and the transmitting from the at least one second antenna is based on the second TPMI when the combined Tx power meets the Tx power threshold.

6. The method of claim 5, wherein the transmitting from the at least one first antenna and the transmitting from the at least one second antenna are based on the received TPMI when the combined Tx power does not meet the Tx power threshold.

7. The method of claim 1, further comprising:
    receiving TPMI mapping information indicating a mapping between the received TPMI and the set of TPMIs, wherein the set of TPMIs is determined based on the received TPMI mapping information.

8. The method of claim 7, wherein the TPMI mapping information is received through one of a radio resource control (RRC) message or a Medium Access Control (MAC) Control Element (CE) (MAC-CE).

9. The method of claim 1, further comprising:
    receiving a radio resource control (RRC) message configuring the at least one first subband and the at least one second subband.

10. The method of claim 1, wherein the set of TPMIs is determined based on at least one of a pre-specified sequence, a cycled state of the pre-specified sequence, a slot index, a hybrid automatic repeat request (HARQ) identifier (ID), or an ID of the UE.

11. The method of claim 1, further comprising:
reporting a UE capability to a base station, wherein the UE capability indicates at least one of:
a number of subbands including the at least one first subband and the at least one second subband;
a minimum size for a subband of the at least one first subband and the at least one second subband; or
a maximum difference in size between a pair of subbands of the at least one first subband and the at least one second subband.

12. The method of claim 1, further comprising:
determining a size of each subband of the at least one first subband and the at least one second subband; and
determining whether the size of each subband is greater than or equal to a threshold,
wherein the transmitting from the at least one first antenna is based on the first TPMI and the transmitting from the at least one second antenna is based on the second TPMI when the size of each subband is greater than or equal to the threshold.

13. The method of claim 12, wherein the transmitting from the at least one first antenna and the transmitting from the at least one second antenna are based on the received TPMI when the size of one or more of the at least one first subband and the at least one second subband is less than the threshold.

14. The method of claim 1, wherein the at least one first antenna and the at least one second antenna are switched between the at least one first subband and the at least one second subband during frequency hopping.

15. An apparatus for wireless communication, comprising:
means for receiving a transmitted precoding matrix indicator (TPMI) associated with at least one first antenna and at least one second antenna, the at least one first antenna and the at least one second antenna being non-coherent with each other;
means for determining a set of TPMIs based on the received TPMI, the set of TPMIs including at least one TPMI different from the received TPMI;
means for transmitting, based on a first TPMI of the set of TPMIs, from the at least one first antenna within at least one first subband; and
wherein the means for transmitting is further configured to transmit, based on a second TPMI of the set of TPMIs, from the at least one second antenna within at least one second subband different from the at least one first subband.

16. An apparatus for wireless communication, comprising:
a memory; and
at least one processor coupled to the memory and configured to:
receive a transmitted precoding matrix indicator (TPMI) associated with at least one first antenna and at least one second antenna, the at least one first antenna and the at least one second antenna being non-coherent with each other;
determine a set of TPMIs based on the received TPMI, the set of TPMIs including at least one TPMI different from the received TPMI;
transmit, based on a first TPMI of the set of TPMIs, from the at least one first antenna within at least one first subband; and
transmit, based on a second TPMI of the set of TPMIs, from the at least one second antenna within at least one second subband different from the at least one first subband.

17. The apparatus of claim 16, wherein the at least one processor is further configured to:
transmit a scheduling request (SR) for an uplink grant, wherein the TPMI is received in the uplink grant in response to the SR.

18. The apparatus of claim 16, wherein the at least one first antenna comprises a first set of coherent antennas and the at least one second antenna comprises a second set of coherent antennas.

19. The apparatus of claim 16, wherein the at least one first subband and the at least one second subband are divisions of a Physical Uplink Shared Channel (PUSCH) resource allocation.

20. The apparatus of claim 16, wherein the at least one processor is further configured to:
determine a combined transmission (Tx) power for transmitting from the at least one first antenna and the at least one second antenna; and
determine whether the combined Tx power meets a Tx power threshold,
wherein the at least one processor is configured to transmit from the at least one first antenna based on the first TPMI and to transmit from the at least one second antenna based on the second TPMI when the combined Tx power meets the Tx power threshold.

21. The apparatus of claim 20, wherein the at least one processor is configured to transmit from the at least one first antenna and from the at least one second antenna based on the received TPMI when the combined Tx power does not meet the Tx power threshold.

22. The apparatus of claim 16, wherein the at least one processor is further configured to:
receive TPMI mapping information indicating a mapping between the received TPMI and the set of TPMIs, wherein the set of TPMIs is determined based on the received TPMI mapping information.

23. The apparatus of claim 22, wherein the TPMI mapping information is received through one of a radio resource control (RRC) message or a Medium Access Control (MAC) Control Element (CE) (MAC-CE).

24. The apparatus of claim 16, wherein the at least one processor is further configured to:
receive a radio resource control (RRC) message configuring the at least one first subband and the at least one second subband.

25. The apparatus of claim 16, wherein the set of TPMIs is determined based on at least one of a pre-specified sequence, a cycled state of the pre-specified sequence, a slot index, a hybrid automatic repeat request (HARQ) identifier (ID), or an ID of a user equipment (UE).

26. The apparatus of claim 16, wherein the at least one processor is further configured to:
report a UE capability to a base station, wherein the UE capability indicates at least one of:
a number of subbands including the at least one first subband and the at least one second subband;
a minimum size for a subband of the at least one first subband and the at least one second subband; or
a maximum difference in size between a pair of subbands of the at least one first subband and the at least one second subband.

27. The apparatus of claim 16, wherein the at least one processor is further configured to:

determine a size of each subband of the at least one first subband and the at least one second subband; and determine whether the size of each subband is greater than or equal to a threshold, wherein the at least one processor is configured to transmit from the at least one first antenna based on the first TPMI and from the at least one second antenna based on the second TPMI when the size of each subband is greater than or equal to the threshold.

28. The apparatus of claim 27, wherein the at least one processor is configured to transmit from the at least one first antenna and from the at least one second antenna based on the received TPMI when the size of one or more of the at least one first subband and the at least one second subband is less than the threshold.

29. The apparatus of claim 16, wherein the at least one first antenna and the at least one second antenna are switched between the at least one first subband and the at least one second subband during frequency hopping.

30. A computer-readable medium storing computer executable code, the code when executed by a processor cause the processor to:

receive a transmitted precoding matrix indicator (TPMI) associated with at least one first antenna and at least one second antenna, the at least one first antenna and the at least one second antenna being non-coherent with each other;

determine a set of TPMIs based on the received TPMI, the set of TPMIs including at least one TPMI different from the received TPMI;

transmit, based on a first TPMI of the set of TPMIs, from the at least one first antenna within at least one first subband; and transmit, based on a second TPMI of the set of TPMIs, from the at least one second antenna within at least one second subband different from the at least one first subband.

* * * * *